US006760385B1

(12) United States Patent
Goodson

(10) Patent No.: US 6,760,385 B1
(45) Date of Patent: Jul. 6, 2004

(54) UNIVERSAL PARALLEL PROCESSING DECODER

(75) Inventor: Richard L. Goodson, Huntsville, AL (US)

(73) Assignee: ADTRAN, Inc., Huntsville, AL (US)

( * ) Notice: Subject to any disclaimer, the term of this patent is extended or adjusted under 35 U.S.C. 154(b) by 786 days.

(21) Appl. No.: 09/580,959

(22) Filed: May 30, 2000

(51) Int. Cl.$^7$ .......................... H04L 27/06; H03K 7/00; H03K 9/00
(52) U.S. Cl. ...................... 375/265; 375/340; 332/106; 329/311
(58) Field of Search .................. 375/265, 94, 340–341; 714/795, 1–57; 371/43

(56) References Cited

U.S. PATENT DOCUMENTS

| | | | | |
|---|---|---|---|---|
| 4,520,490 A | * | 5/1985 | Wei ............................ | 375/246 |
| 4,761,784 A | * | 8/1988 | Srinivasagopalan et al. ..... | 714/795 |
| 4,998,253 A | * | 3/1991 | Ohashi et al. ............... | 714/791 |
| 5,432,803 A | * | 7/1995 | Liu et al. .................... | 714/794 |
| 5,872,817 A | * | 2/1999 | Wei ............................ | 375/341 |
| 5,920,599 A | * | 7/1999 | Igarashi ...................... | 375/341 |
| 5,946,361 A | * | 8/1999 | Araki et al. ................. | 375/341 |
| 6,141,391 A | * | 10/2000 | Morelos-Zaragoza et al. ... | 375/341 |
| 6,151,370 A | * | 11/2000 | Wei ............................ | 375/341 |
| 6,212,654 B1 | * | 4/2001 | Lou et al. .................... | 714/701 |
| 6,259,749 B1 | * | 7/2001 | Andoh ........................ | 375/341 |
| 6,330,684 B1 | * | 12/2001 | Yamanaka et al. ............. | 714/1 |

* cited by examiner

Primary Examiner—Stephen Chin
Assistant Examiner—Cicely Ware
(74) Attorney, Agent, or Firm—Thomas, Kayden, Horstemeyer & Risley, L.L.P.

(57) ABSTRACT

The present invention provides an apparatus and method for universal decoding of both feedforward codes and feedback codes, such as decoding of a 512-state feedforward code, a 32-state feedback code and 8-state feedback code. Utilizing parallel processing, the present invention determines, for each current state of a feedforward or a feedback code, its most likely previous states, resulting in a determination of a terminating state and a penultimate terminating state. From the penultimate terminating state and terminating state, associated subset bits are determined. In the preferred embodiment, the subset bits are determined by re-encoding the most significant bit of the penultimate terminating state in an encoder having a current state equal to the terminating state. Utilizing an equalized, received signal, a closest signaling point, with an associated index, is selected from a subset of a signaling constellation corresponding to the associated subset bits. The decoded higher significant bits are determined as equal to the corresponding higher significant bits of the associated index. For a feedforward code, the decoded least significant input bit is determined as equal to the most significant bit of the penultimate terminating state, while for a feedback code, the decoded input bit is determined as equal to the most significant subset bit.

47 Claims, 15 Drawing Sheets

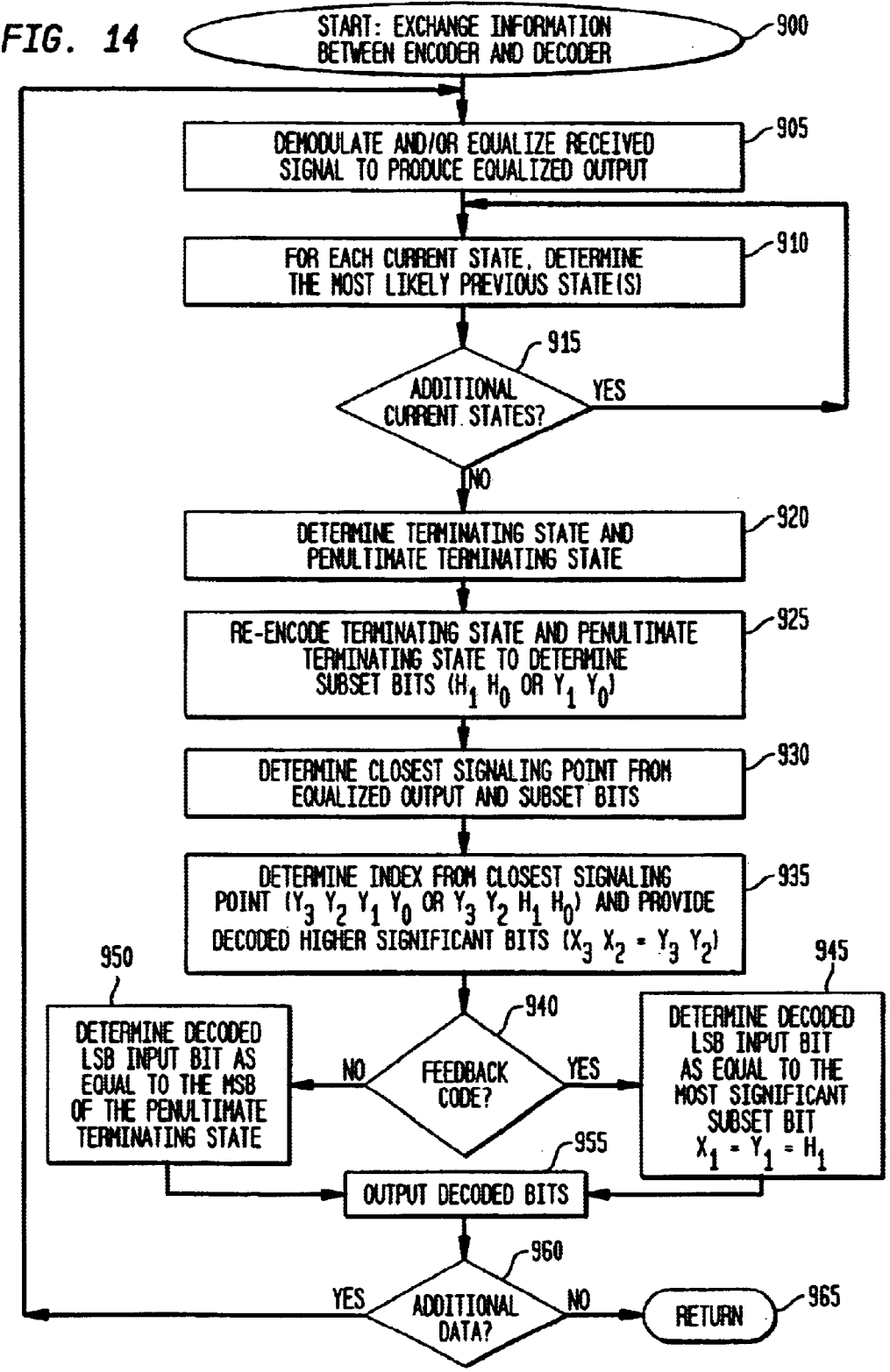

UNIVERSAL PARALLEL PROCESSING DECODER

FIELD OF THE INVENTION

The present invention relates, in general, to data transmission systems and, more particularly, to a universal parallel processing Viterbi decoder for decoding both feedforward and feedback trellis or convolutional codes utilized in high speed data transmission systems, such as in digital subscriber line systems.

BACKGROUND OF THE INVENTION

With the advent of high-speed data transmission systems, various technologies have emerged to provide increased reliability and accuracy of the data transmitted and received. Typically, such data is encoded prior to modulation and transmission, to increase error detection and error correction when the data is received and decoded. The encoded data stream is then mapped or modulated onto any of various, standardized signaling formats or constellations for transmission, such as pulse amplitude modulation ("PAM") or quadrature amplitude modulation ("QAM").

Different encoding schemes have been utilized or are being proposed for encoding in various high-speed data transmission systems, and are being included as recommendations or standards, such as the proposed T1.418 standard promulgated by the American National Standards Institute ("ANSI"). For example, for communication systems such as the next or second generation ("HDSL2") of high bit rate digital subscriber line ("HDSL"), a 512-state, rate ½ feedforward convolutional encoder may be utilized, while other encoding schemes may be utilized for systems such as symmetric digital subscriber line ("SDSL"), asymmetric digital subscriber line ("ADSL"), and other forms of digital subscriber line systems generally referred to as "xDSL". In addition, various older or legacy systems utilize other encoding systems, such as an 8-state, rate ½ feedback convolutional encoding and a 32-state, rate ½ feedback convolutional encoding.

With the use of these multiple and different encoding schemes for data transmission, corresponding decoding following data reception is increasingly difficult and complicated. In the prior art, for systems implementing codes having differing numbers of states and having different feedback or feedforward methodologies, entirely separate and independent decoders have been utilized for compatibility among these systems.

As a consequence, a need remains to provide for a single decoder which is capable of decoding both feedforward and feedback codes. Such a universal decoder should be able to decode codes having differing numbers of states, such as 512 states or 32 states. In addition, such a decoder should provide for parallel processing and should be programmable, allowing the same hardware to provide such universal decoding, rather than utilizing separate hardware to provide independent and redundant decoding systems.

SUMMARY OF THE INVENTION

The present invention provides a single, parallel processing decoder which is capable of decoding both feedforward and feedback codes. The universal decoder of the present invention not only decodes both feedforward and feedback codes, but also decodes codes having differing or variable numbers of states, such as 512 states or 32 states. The universal decoder of the present invention is capable therefore of decoding a 512-state feedforward code which may be utilized for HDSL2, and various legacy codes such as an 8-state feedback code and a 32-state feedback code. The preferred decoder is also programmable, allowing the same hardware to provide such universal decoding, without requiring separate hardware for independent and redundant decoding systems. Lastly, the preferred universal decoder is capable of utilizing parallel processing for both feedback and feedforward codes, providing an increase in the speed of decoding.

The data for decoding will have been typically encoded utilizing a plurality of encoder coefficients and transmitted as a signal from a transmitter to a receiver to form a received signal. In the preferred embodiment, the transmitter and receiver exchange information pertaining to whether the data was encoded utilizing a feedback or feedforward methodology, and exchange information concerning the values of the encoder coefficients utilized in that encoding.

In the decoding process, for each current state of the plurality of states, the method determines a most likely previous state to form a plurality of previous states. This is preferably accomplished by determining a branch metric, as a distance, such as a Euclidean distance, between the received, equalized signal and a closest point of a subset of a signaling constellation. With the various state transitions, the branch metrics are accumulated, forming path metrics, with the shortest path metric retained for each current state. Based upon the various path metrics, the method determines a terminating state and a penultimate terminating state (the next state following the terminating state), from the plurality of previous states. Next, the method determines a plurality of subset bits (in which the plurality of subset bits has a most significant subset bit). In the preferred embodiment, this is accomplished by re-encoding the most significant bit ("MSB") of the penultimate terminating state, with the state of an encoder set to the values of the terminating state, to produce the subset bits corresponding to a state transition from the terminating state to the penultimate terminating state.

These subset bits are utilized to select a corresponding subset of the signaling constellation, and with the equalized output, to determine a comparatively closest signaling point. The comparatively closest signaling point, in turn, is mapped to a corresponding index. The preferred method then determines the higher significant decoded bits as equal to the higher significant bits of the corresponding index. When the data has been feedforward encoded, the decoded least significant input bit is determined as equal to the MSB of the penultimate terminating state. When the data has been feedback encoded, the decoded least significant input bit is determined as equal to the most significant subset bit.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 14 is a flow diagram illustrating a method embodiment for universal decoding in accordance with the present invention.

DETAILED DESCRIPTION OF THE INVENTION

Figure 1:
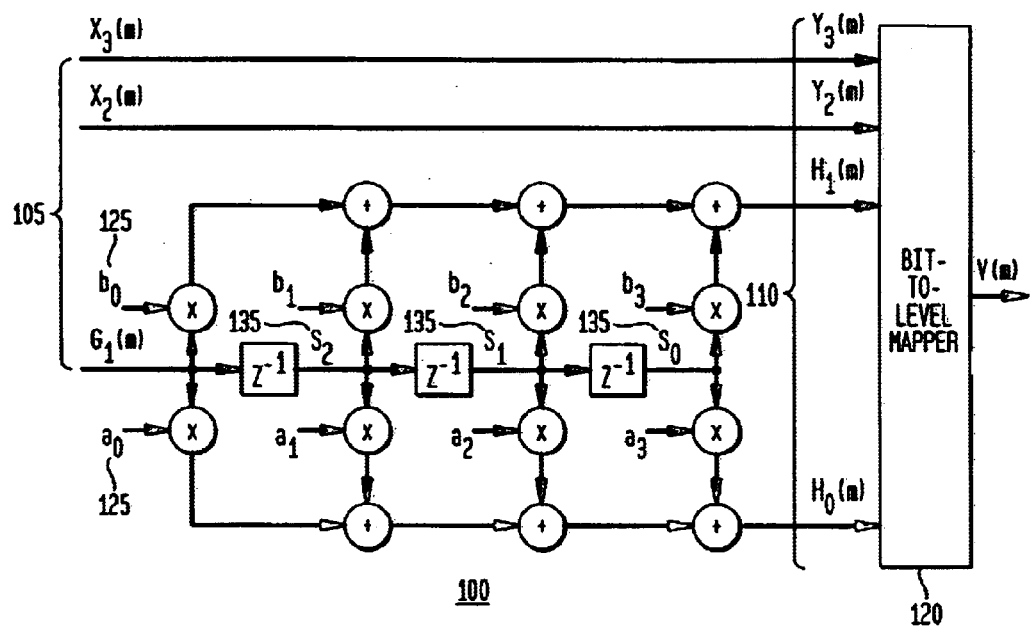
FIG. 1 is a block diagram illustrating an eight state non-systematic feedforward encoder.

While the present invention is susceptible of embodiment in many different forms, there are shown in the drawings and will be described herein in detail specific embodiments thereof, with the understanding that the present disclosure is to be considered as an exemplification of the principles of the invention and is not intended to limit the invention to the specific embodiments illustrated.

As mentioned above, a need remains to provide for a single decoder which is capable of decoding both feedforward and feedback codes. In accordance with the present invention, such a universal decoder is provided for decoding both feedforward and feedback codes, and decoding codes having differing or variable numbers of states, such as 512 states or 32 states. For example, the preferred method and apparatus embodiments of the present invention are capable of decoding a 512-state feedforward code, and various legacy codes such as an 8-state feedback code and a 32-state feedback code. The preferred decoder is also programmable, allowing the same hardware to provide such universal decoding, without requiring separate hardware for independent and redundant decoding systems. In addition, the preferred universal decoder is capable of utilizing parallel processing to, among other things, increase the speed of decoding.

FIG. 1 is a block diagram illustrating an exemplary eight-state non-systematic feedforward encoder 100. As illustrated in FIG. 1, input bits 105 ($X_3(m)$, $X_2(m)$ and $G_1(m)$, with $G_1(m)$ being the least significant bit ("LSB")), are input into the feedforward encoder 100 to produce output bits 110 ($Y_3(m)$, $Y_2(m)$, $H_1(m)$ and $H_0(m)$, with $H_0(m)$ being the LSB). Depending upon the selection of the values for the encoder (or encoding) coefficients 125 (b0, b1, b2, b3 and a0, a1, a2, a3), the encoder will have different states 135 ($S_2S_1S_0$) and produce variable output bits 110 from the same input bits 105. (The encoder coefficients, as used herein, are also referred to in the art as polynomial coefficients or encoding polynomial coefficients.) As a consequence, for uniformity, a feedforward encoder is specified by the values for its encoder coefficients 125 (b0, b1, b2, b3 and a0, a1, a2, a3), so that the same input bits 105 will produce the same output bits 110 in any feedforward encoder having the same encoder coefficients 125.

The feedforward encoder 100 is considered a rate ½ encoder, with encoding of the LSB input bit $G_1(m)$ producing two output bits (referred to herein as "subset" bits 130) $H_1(m)$ and $H_0(m)$. The remaining input bits $X_3(m)$ and $X_2(m)$ are mapped directly to the other remaining output bits $Y_3(m)$ and $Y_2(m)$, respectively (i.e., the higher significant output bits are set equal to corresponding higher significant input bits). (While illustrated in FIG. 1 with three input bits 105 mapped to four output bits 110, additional higher significant input bits may be included, which then are also mapped directly to additional, corresponding higher significant output bits). The output bits 110 are then typically fed into a bit-to-level mapper 120 or other modulator, for modulation or level mapping (e.g., QAM or PAM). The feedforward encoder 100 is also considered an eight-state encoder, with the states 135 ($S_2S_1S_0$) having up to eight values (000 (0), 001 (1), 010 (2), 011 (3), 100 (4), 101 (5), 110 (6) and 111 (7)).

Figure 2:
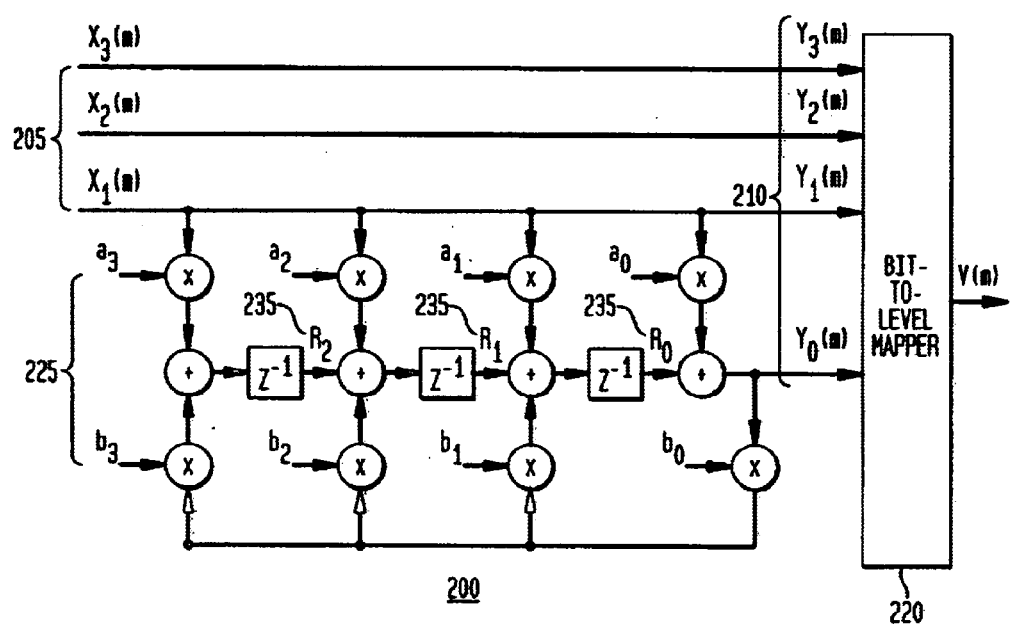
FIG. 2 is a block diagram illustrating an eight state systematic feedback encoder.

FIG. 2 is a block diagram illustrating an exemplary eight-state systematic feedback encoder 200. As illustrated in FIG. 2, input bits 205 $X_3(m)$, $X_2(m)$ and $X_1(m)$, with $X_1(m)$ being the least significant bit ("LSB")), are input into the feedback encoder 200 to produce output bits 210 ($Y_3(m)$, $Y_2(m)$, $Y_1(m)$ and $Y_0(m)$, with $Y_0(m)$ being the LSB). Also depending upon the selection of the values of the encoder coefficients 225 (b0, b1, b2, b3 and a0, a1, a2, a3), the encoder 200 will have different states 235 ($R_2R_1R_0$) and produce variable output bits 210 from the same input bits 205. As a consequence, for uniformity, a feedback encoder is also specified by the values of its encoder coefficients 225 (b0, b1, b2, b3 and a0, a1, a2, a3), so that the same input bits 205 will produce the same output bits 210 in any feedback encoder having the same encoder coefficients 225.

The feedback encoder 200 is also considered a rate ½ encoder, with encoding of the LSB input bit $X_1(m)$ producing two output bits (also referred to herein as "subset" bits 230) $Y_1(m)$ and $Y_0(m)$, with $Y_1(m)$ set equal to $X_1(m)$. The remaining input bits $X_3(m)$ and $X_2(m)$ are also mapped directly to the other remaining output bits $Y_3(m)$ and $Y_2(m)$, respectively (i.e., the higher significant output bits are set equal to corresponding higher significant input bits). (While also illustrated in FIG. 2 with three input bits 205 mapped to four output bits 210, additional higher significant input bits may be included, which then are also mapped directly to additional, corresponding higher significant output bits). The output bits 210 are then also typically fed into a bit-to-level mapper 220, for modulation or mapping (e.g., QAM or PAM). The feedback encoder 200 is also considered an eight-state encoder, with the states 235 ($R_2R_1R_0$) having up to eight values (000 (0), 001 (1), 010 (2), 011 (3), 100 (4), 101 (5), 110 (6) and 111 (7)).

Figure 3A:
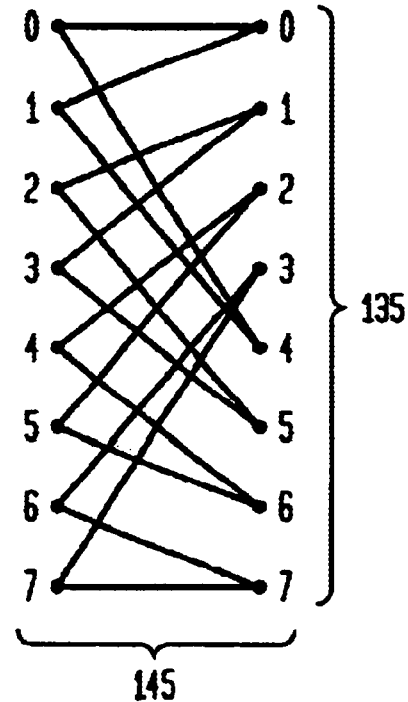
FIG. 3A is a trellis diagram illustrating state transitions for a feedforward code.

FIG. 3A is a trellis diagram illustrating exemplary state transitions 145 for an eight-state feedforward code, with encoder coefficients [a3, a2, a1, a0] equal to [0, 1, 0, 0] and [b3, b2, b1, b0] equal to [1, 0, 1, 1] (or, equivalently, [a0, a1, a2, a3] equal to [0, 0, 1, 0] and [b0, b1, b2, b3] equal to [1, 1, 0, 1]). Transitions 145 of states 135 ($S_2S_1S_0$) are illustrated for various combinations of values of the input bit $G_1(m)$ and subset bits 130 ($H_1(m)$ and $H_0(m)$) (abbreviated as g1/h1h0, to represent the discrete values of $G_1(m)$, $H_1(m)$ and $H_0(m)$ at any given instant of time (or state)). As illustrated in FIG. 3A, the state transitions 145 (from current states to next states) appear to be highly symmetric.

Figure 3B:
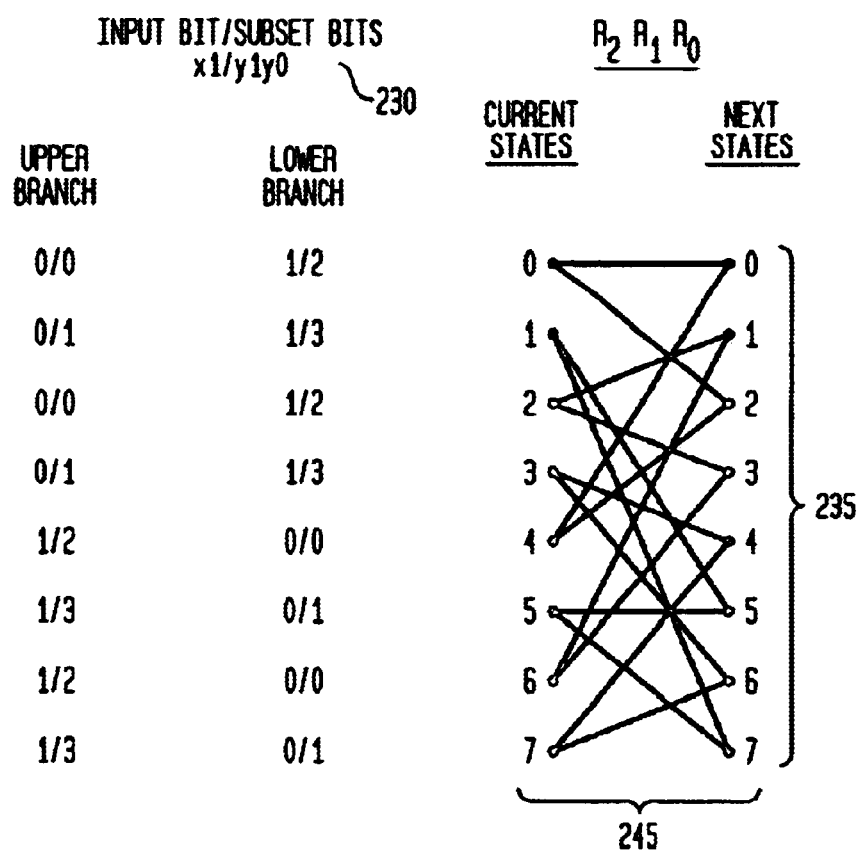
FIG. 3B is a trellis diagram illustrating state transitions for a feedback code.

FIG. 3B is a trellis diagram illustrating exemplary state transitions 245 for an eight-state feedback code, also with encoder coefficients [a3, a2, a1, a0] equal to [0, 1, 0, 0] and [b3, b2, b1, b0] equal to [1, 0, 1, 1] (or, equivalently, [a0, a1, a2, a3] equal to [0, 0, 1, 0] and [b0, b1, b2, b3] equal to [1, 1, 0, 1]). Transitions 245 of states 235 ($R_2R_1R_0$) are illustrated for various combinations of values of the input bit $X_1(m)$ and subset bits 230 ($Y_1(m)$ and $Y_0(m)$) (also abbreviated as x1/y1y0, to represent the discrete values of $X_1(m)$, $Y_1(m)$ and $Y_0(m)$ at any given instant of time (or state)). As illustrated in FIG. 3B, the state transitions 245 appear to be highly asymmetric, with no apparent pattern.

Figure 3C:
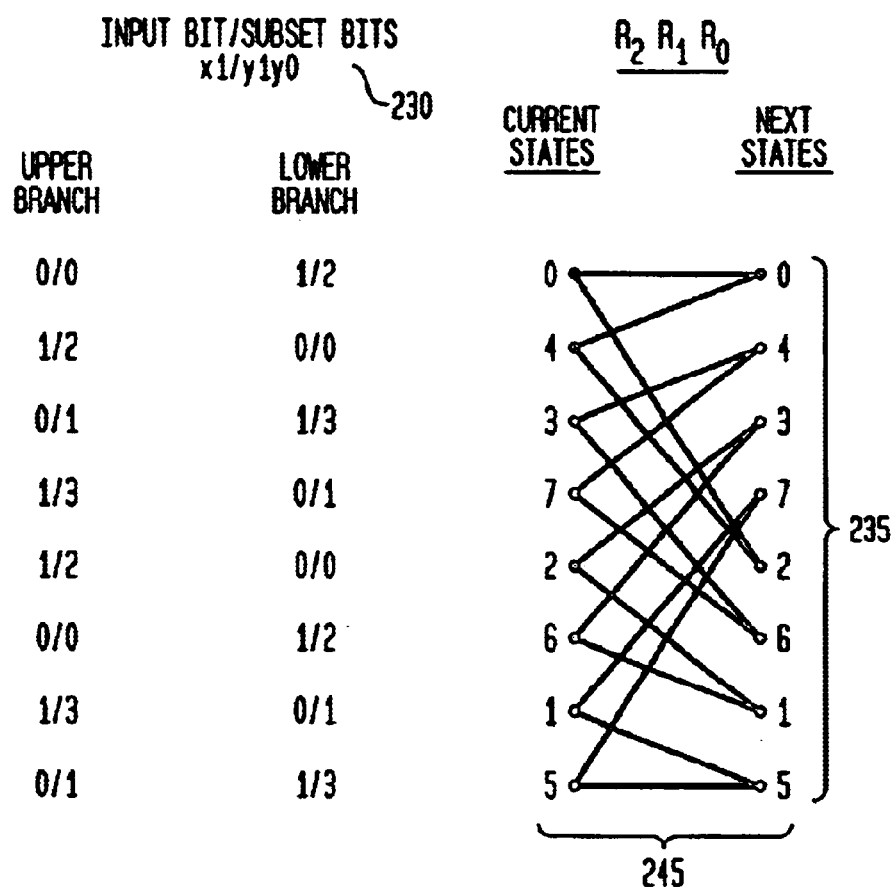
FIG. 3C is a trellis diagram illustrating state transitions for a feedback code mapped (permuted) to a feedforward code.

FIG. 3C is a trellis diagram illustrating exemplary state transitions 245 for the feedback code of FIG. 3B mapped (permuted) to a feedforward code, (as discussed in greater detail below), also with encoder coefficients [a3, a2, a1, a0] equal to [0, 1, 0, 0] and [b3, b2, b1, b0] equal to [1, 0, 1, 1] (or, equivalently, [a0, a1, a2, a3] equal to [0, 0, 1, 0] and [b0, b1, b2, b3] equal to [1, 1, 0, 1]). Transitions 245 of states 235 ($R_2R_1R_0$) are also illustrated for various combinations of values of the input bit $X_1(m)$ and subset bits 230 ($Y_1(m)$ and $Y_0(m)$) (x1/y1y0), as previously illustrated in FIG. 3B. For the trellis diagram of FIG. 3C, however, the state transitions 245 of the feedback encoder 200 have been rearranged or mapped to reflect the symmetry available in a feedforward code. As discussed in greater detail below, the states 235 $R_2R_1R_0$ themselves may be redefined or renamed, and then the state transitions of the feedback code would be identical to that, of the feedforward code illustrated in FIG. 3A. As illustrated in FIG. 3C, the state transitions 245 are now highly symmetric, exhibiting the same pattern as the feedforward code of FIG. 3A, and are suitable for decoding with parallel processing in accordance with the present invention.

Conceptually underlying the present invention, the state transitions of a feedback code may be mapped or permuted to equivalent state transitions of a feedforward code, such that each corresponding trellis will have identical transitions. This mapping, for example, may be accomplished through determination of a permutation matrix, to map the states of a feedback code to equivalent states of a feedforward code. More specifically, a vector S for the states of a feedforward code, a vector R for the states of a feedback code, a permutation matrix P and an inverse permutation matrix $P^{-1}$, may be defined (as an example, for an eight-state code, with additional states represented by increasing the degree of each vector and matrix):

$$S = \begin{bmatrix} s_2 \\ s_1 \\ s_0 \end{bmatrix}, \quad R = \begin{bmatrix} r_2 \\ r_1 \\ r_0 \end{bmatrix}, \quad P = \begin{bmatrix} p11 & p12 & p13 \\ p21 & p22 & p23 \\ p31 & p32 & p33 \end{bmatrix}, \quad P^{-1} = \begin{bmatrix} v11 & v12 & v13 \\ v21 & v22 & v23 \\ v31 & v32 & v33 \end{bmatrix}$$

Values of the permutation matrix P and inverse permutation matrix $P^{-1}$ may be determined such that S=PR and $R=P_{-1}S$, allowing the states of a feedback code (R) to be mapped to the states of a feedforward code (S), forming a conceptual basis for the decoding process of the present invention. For example, for an 8-state code, with b0=1, $$P^{-1} = \begin{bmatrix} a3 & a1b3 + a3b1 & a2b3 + a3b2 \\ a2 & a0b3 + a1b2 + a2b1 + a3 & a1b3 + a3b1 \\ a1 & a0b2 + a2 & a0b3 + a3 \end{bmatrix}$$

While such a mapping has been illustrated in FIGS. 3B and 3C for an eight-state code, such a mapping or permutation may be extended to any higher order code, such as to a 512-state code which may be utilized for HDSL2. (Given the availability of such a permutation or mapping, for the decoding of the present invention, states of either a feedforward or feedback code will be referred to herein generally as a state "S", such as a state $S_X$ or a state S having a value of $S_2S_1S_0$).

As discussed in greater detail below, given that the states of a feedback code may be mapped to equivalent states of a feedforward code, the output bits 210 of the feedback code may be decoded as if the code were a feedforward code, in accordance with the present invention. It should be noted, however, that while a feedforward code and a feedback code may be equivalent in terms of having identical state transitions (145 and 245) to generate identical output bits (110 or 210), the corresponding input bits (105 or 205) which caused those transitions and outputs will, in general, not be the same. More specifically, feedforward input bits 105 ($G_1(m)$, $X_2(m)$, $X_3(m, ...$) may or may not, and typically will not, equal corresponding feedback input bits 205 ($X_1(m)$, $X_2(m)$, $X_3(m)$, ...) for any given state transition or sequence of state transitions 145 or 245, although the output bits 110 and 210 may be identical. Given the typical encoders 100 or 200 utilized in the art, in which the LSB input bit is encoded to produce two subsets bits (130 or 230), with the remaining input bits mapped directly to corresponding output bits, this non-identity typically means that $G_1(m)$ may or may not equal $X_1(m)$ for any given sequence of state transitions.

As a consequence, in accordance with the present invention, the decoding process for an identical input stream of encoded bits, with identical state transitions, will correspond to different associated, decoded bits and will provide different results (decoded bit streams), depending upon whether the original encoding process was a feedforward or a feedback process. In the preferred embodiment, therefore, prior to data transmission (full duplex), each encoder (at the transmitter side) and each decoder (at the receiving side) exchange information pertaining to: (1) whether the encoder utilizes a feedforward or feedback encoding process; (2) the actual values of the encoder coefficients (b0, b1, b2, b3, etc., and a0, a1, a2, a3, etc.) utilized in the encoding or preferred in the decoding; and (3) the type of bit-to-level mapper (120 or 220) (or modulator) utilized (if any). This exchange of information typically occurs in a handshaking, probing or similar process at the beginning of a given communication session. For example, for HDSL2, the decoder (of one device) sends the values of the encoder coefficients 125 to the encoder (of another device) for that encoder to utilize (at the transmission side), while for older, legacy products, exchange of information identifying the type of product generally includes use of a standard or fixed encoding system, such as a 32-state feedback encoding with fixed values of the encoder coefficients 225.

In the decoding process of the present invention, for both feedforward and feedback systems, the received higher significant bits, having been encoded directly as equal to the higher significant input bits, are determined based upon a closest signaling point in a subset of the signaling constellation, with the subset of the signaling constellation corresponding to the subset bits, as discussed in greater detail below. The subset bits, and corresponding LSB input bit which was encoded to form the subset bits, are determined through the decoding process of the present invention, as discussed in detail below.

Figure 4:
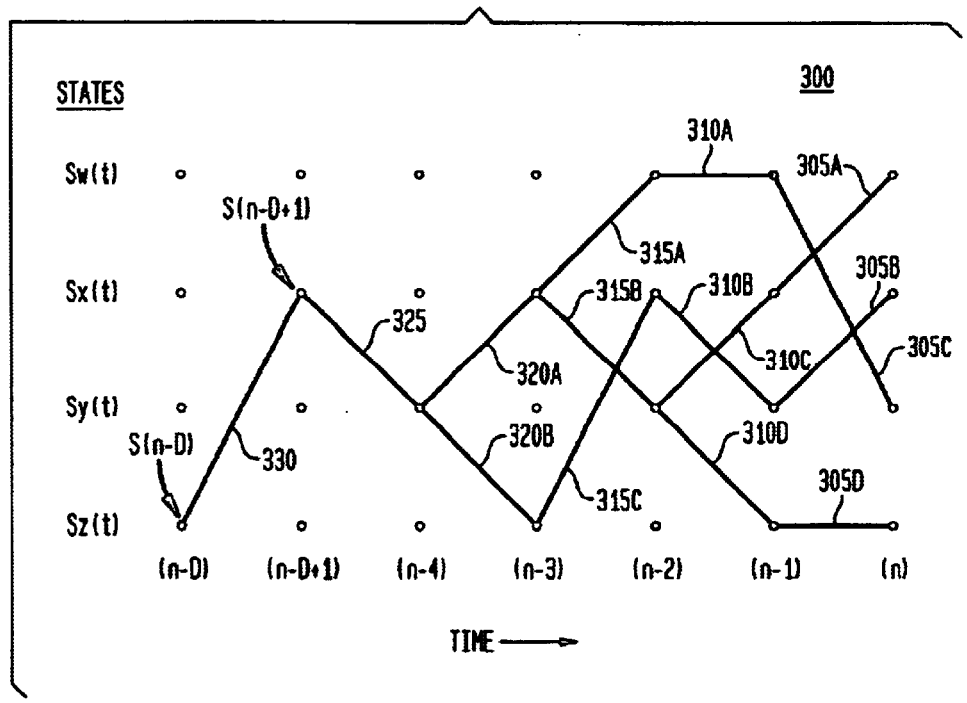
FIG. 4 is a trellis diagram illustrating an exemplary lookback procedure for a four state code.

FIG. 4 is a trellis diagram illustrating an exemplary lookback procedure for a four-state code, to provide an overview of the decoding process utilized in the preferred embodiment of the present invention. As illustrated in FIG. 4, at a current time n, for each current state $S_W(n)$, $S_X(n)$, $S_Y(n)$ and $S_Z(n)$, based upon the received signal, a maximum likelihood (Viterbi) decoder determines the most likely previous associated state (at time t=(n−1)), given the allowable state transitions of the particular code, illustrated as an example utilizing branches $305_A$, $305_B$, $305_C$ and $305_D$. Going back in time, each branch "connects" a current state to a possible previous state, resulting in a cumulative "path" to a sequence of possible previous states (some of which are more likely than others, as discussed in greater detail below). For example, for state $S_W$ at time t=n, there exists a path comprised of branches 305A (to previous state $S_X$ at time t=n−1), branch 310C (to previous state $S_Y$ at time t=n−2), branch 315B (to previous state $S_X$ at time t=n−3), branch 320A (to previous state $S_Y$ at time t=n−4), branch 325 (to previous state $S_X$ at time t=n−D+1), and lastly branch 330 (to previous state $S_Z$ at time t=n−D). Similarly, for state $S_Y$ at time t=n, there exists a path comprised of branches 305C (to previous state $S_W$ at time t=n−1), branch 310A (to previous state $S_W$ at time t=n−2), branch 315A (to previous state $S_X$ at time t=n−3), branch 320A (to previous state $S_Y$ at time t=n−4), branch 325 (to previous state $S_X$ at time t=n−D+1), and lastly branch 330 (to previous state $S_Z$ at time t=n−D), and so on, for each current state.

As discussed in greater detail below, each such branch comprising each of these various paths has an associated branch metric, as an indicator of the likelihood of its occurrence, and each such path has an associated path metric, also as an indicator of the likelihood of its occurrence. More specifically, for a rate ½ code, for example, each current state has two possible previous states leading to it, each with an associated branch metric and path metric; as illustrated in FIG. 4, the lower probability branch (as indicated by the sum of its associated path metric plus branch metric) is dropped from consideration (or "pruned"), resulting in one branch from a current state to a previous state (illustrated as branches 305 for current states at time t=n). Going back in time (ie., performing a "lookback"), each current branch metric (of the surviving branch) is added to a previous branch metric for each interval, forming an overall path metric. Based upon these probabilities and corresponding pruning, continuing to go back in time, such as at time t=n−4, the various branches to previous states converge upon state $S_Y$ (branches 320), as the most likely previous state at time t=(n−4), further converge upon state $S_X$ (branch 325) as the most likely previous state at time t=(n−D+1), and further converge upon state $S_Z$ (branch 330) as the most likely previous state at time t=(n−D). The last or oldest state being tracked (at time t=(n−D)), state $S_Z$ in this case, is referred to herein as a terminating state S(n−D), while the next-to-last state being tracked (at time t=(n−D+1), state $S_X$ in this case, is referred to herein as a penultimate terminating state S(n−D+1). Knowing the terminating state S(n−D) (in this case, state $S_Z$ at time t=(n−D)) and the penultimate terminating state S(n−D+1) (in this case, state $S_X$ at time t=(n−D+1)), the subset bits which are associated with this state transition (from terminating state to penultimate terminating state) may be determined in accordance with the present invention.

Continuing to refer to FIG. 4 and FIG. 1, for a feedforward code, for each state transition at a given time, the feedforward encoder 100 to some degree has a shift register functionality upon the input of $G_1(m)$, such that an input of $G_1(n-D)$ at the terminating state S(n−D) (having a form $S_2(n-D)$ $S_1(n-D)$ $S_0(n-D)$) transitions to the penultimate terminating state S(n−D+1) (having the form $G_1(n-D)$ $S_2(n-D)$ $S_1(n-D)$=$S_2(n-D+1)$ $S_1(n-D+1)$ $S_0(n-D+1)$). Expressed in another way, having identified the terminating and penultimate terminating states, the subset bits associated with the corresponding state transition (from the terminating state to the penultimate terminating state) may be determined by the "re-encoding" process of the present invention; namely, with the current state of an encoder set equal to the terminating state, the MSB of the penultimate state is encoded as an input bit (utilizing the encoder coefficients) to generate the subset bits (h1h0 or, equivalently, y1y0) corresponding to that state transition. More generally, with the state of an encoder set equal to a previous state, the MSB of the current state may be encoded (as an input bit) to generate the subset bits (h1h0 or y1y0) corresponding to that particular state transition (from a previous state to a current state). This process of determining the subset bits from the terminating state and the penultimate state, or from a previous state and a current state, is referred to herein as "re-encoding". (Alternatively, and also within the scope of the present invention, in lieu of re-encoding, the subset bits associated with a particular state transition, such as from a previous state to a current state, or from a terminating state to a penultimate terminating state, may also be determined utilizing other methods, such as a lookup table.)

With the determination of a subset for a given transition, and based upon a selection of a closest point in the corresponding signaling constellation subset (determined by the received, equalized signal), the decoded output bits are determined. As discussed in greater detail below, the higher significant bits are directly determined from the corresponding index associated with the closest point of the constellation; for a feedforward code, the LSB input bit is determined as equal to the MSB of the penultimate terminating state, and for a feedback code, the LSB input bit is determined as equal to the MSB of the corresponding subset bits (i.e., input bit $X_1(m)$ is equal to $Y_1(m)$, or for any given state transition at a particular time interval, x1=y1=h1, and y0=h0).

Figure 5:
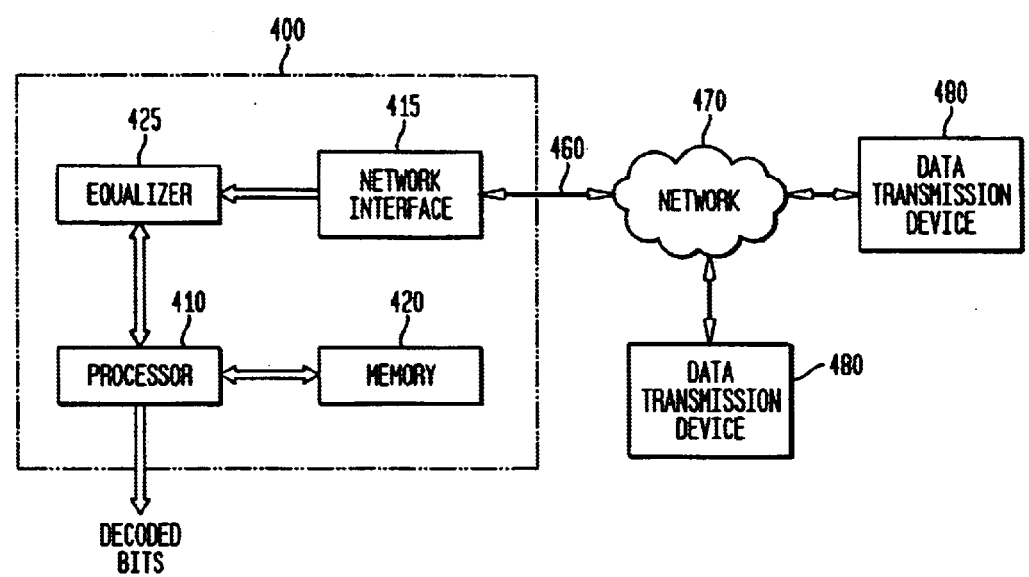
FIG. 5 is a block diagram illustrating apparatus and system embodiments for universal decoding in accordance with the present invention.

FIG. 5 is a block diagram illustrating an apparatus embodiment 400 for universal decoding in accordance with the present invention. The data transmission apparatus 400 is typically coupled or connected via a channel 460 to a network 470, which may be any type of network, such as a local loop or a public switched telephone network (PSTN). The channel 460 is preferably one or more twisted pairs of copper wire, to support HDSL2 for example, but also may be any other type of medium, such as coaxial cable or fiber optic cable. The data transmission apparatus 400 receives and transmits encoded (and modulated) data, respectively from and to one or more other data transmission devices (such as data transmission devices 480), via the network 470. As used herein, whenever an apparatus 400 is transmitting information, it may be referred to as a transmitter, and whenever an apparatus 400 is receiving information, it may be referred to as a receiver, regardless of any particular protocol or modulation technique.

The data transmission apparatus 400 includes a network interface 415, an equalizer 425, a processor 410 and a memory 420. The network interface 415 is utilized to receive and transmit information and other data, control messages, and other pertinent information, to and from the network 470, and is typically designed to interface with a selected type of channel 460 (such as for HDSL2 over twisted pair) and a packet-based or other network 470. The equalizer 425 may be implemented as known in the art, to provide for varying conditions of the channel 460 (such as noise), and for purposes of this invention, need only provide a stream of digital representations to the processor 410 for decoding, such as digital representations of voltage levels (for PAM) or I (in-phase) and Q (quadrature) levels (for QAM). For a QAM protocol, the apparatus 400 may also include a demodulator, to demodulate a received signal prior to equalization. As may be understood in the art, a portion of the equalization may be performed in the transmitter, such as Tomlinson-Harashima precoding.

The apparatus 400 also includes a processor 410 and a memory 420. The memory 420 is preferably an integrated circuit (such as random access memory (RAM) in any of its various forms), but also may be a magnetic hard drive, an optical storage device, or any other type of data storage apparatus. The memory 420 is used to store information obtained during the decoding process, as discussed below, and also may store information pertaining to program instructions or configurations, if any (discussed below). Also as discussed in greater detail below, the processor 410 receives a bit stream (representative of voltage levels) from an equalizer 425, and produces the decoded bit stream, in accordance with the present invention.

Continuing to refer to FIG. 5, the processor 410 may include a single integrated circuit ("IC"), or may include a plurality of integrated circuits or other components connected, arranged or grouped together, such as microprocessors, digital signal processors ("DSPs"), custom ICs, application specific integrated circuits ("ASICs"), field programmable gate arrays ("FPGAs"), associated memory (such as RAM and ROM), and other ICs and components. As a consequence, as used herein, the term processor should be understood to equivalently mean and include a single IC, or arrangement of custom ICs, ASICs, processors, microprocessors, controllers, FPGAs, or some other grouping of integrated circuits which perform the functions discussed above and also discussed in detail below with reference to FIGS. 6–14, with associated memory, such as microprocessor memory or additional RAM, DRAM, SRAM, MRAM, ROM, EPROM or EPROM. The processor 410 with its associated memory may be configured (via programming or hard-wiring) to perform the methodology of the invention, as discussed above with reference to FIGS. 1–4 and as discussed below with reference to FIGS. 6–14. For example, the methodology may be programmed and stored, in the processor 410 with its associated memory (and/or memory 420) and other equivalent components, as a set of program instructions (or equivalent configuration or other program) for subsequent execution when the processor 410 is operative (i.e., powered on and functioning). Equivalently, when the processor 410 with its associated memory and other equivalent components are implemented in whole or part as FPGAs, custom ICs and/or ASICs, the FPGAs, custom ICs or ASICs also may be designed, configured and/or hard-wired to implement the methodology of the invention. In the preferred embodiment, the processor 410 is implemented in its entirety as an ASIC, which is configured (hard-wired) through its design (such as gate and interconnection layout) to implement the methodology of the invention, and to include the memory 420.

Figure 6:
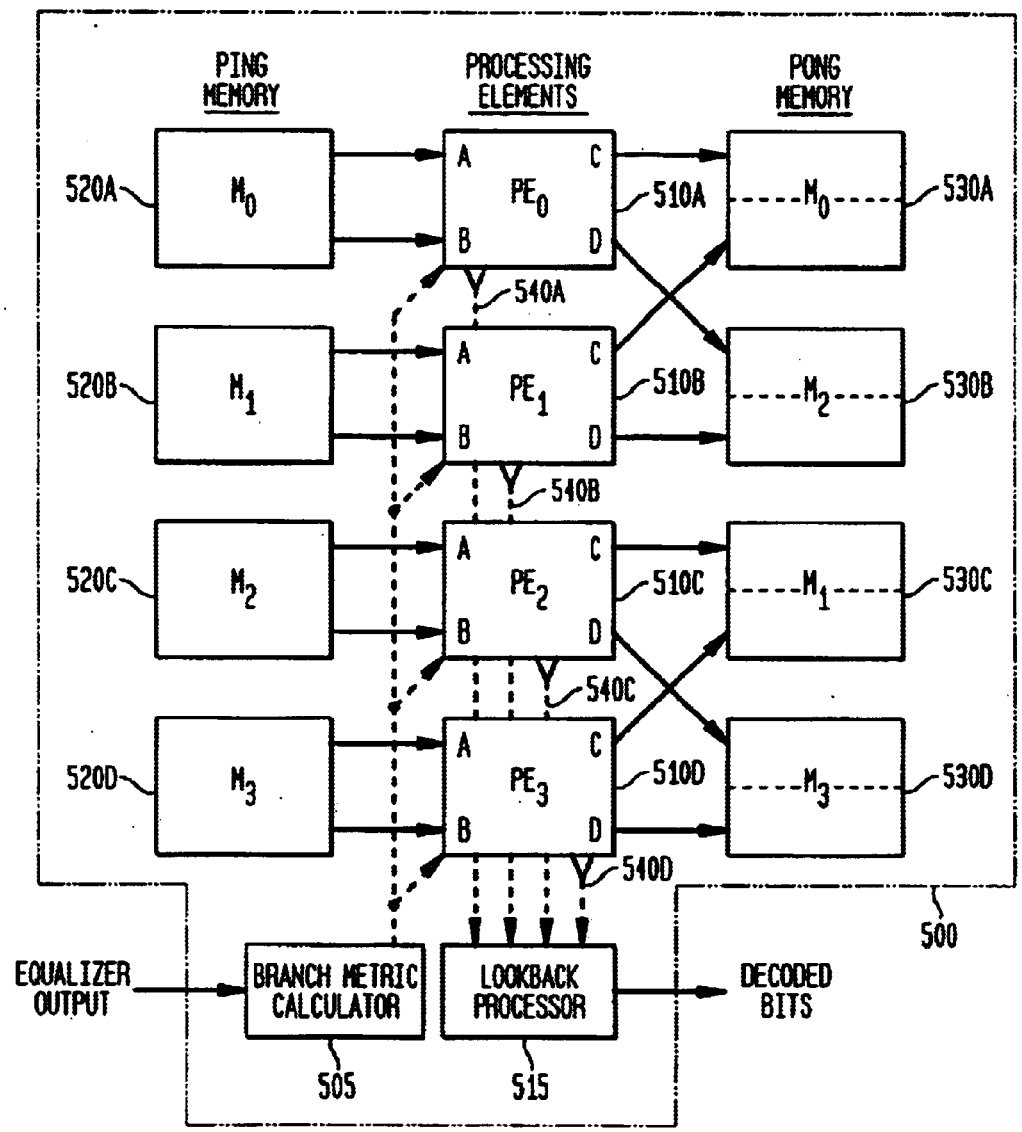
FIG. 6 is a block diagram illustrating a preferred apparatus embodiment for universal decoding in accordance with the present invention.

FIG. 6 is a block diagram illustrating a preferred apparatus embodiment 500 for universal, parallel processing decoding in accordance with the present invention, and is preferably implemented as an ASIC. In the preferred embodiment, while four parallel processing paths are utilized, a fewer or greater number of parallel processing paths also may be implemented within the scope of the invention. The processor 410, which may be one or more processors, is logically or functionally divided into four parallel processing elements 510A, 510B, 510C and 510D (collectively processing elements 510), into a lookback processor 515, and into a branch metric calculator 505. The memory 420 is divided, also for parallel processing, into four "ping" memories 520 and into four "pong" memories 530, corresponding to each parallel processing element 510A, 510B, 510C and 510D, namely, ping memories 520A, 520B, 520C and 520D (collectively ping memories 520), and pong memories 530A, 530B, 530C and 530D (collectively pong memories 530). The memories 520 and 530 are referred to as "ping" and "pong" memories because, during any given set of calculations, reading of data will be from a first set of memories (e.g., ping), and writing of data will be to the other, second set of memories (e.g., pong), which is then alternated for each next set of calculations (reading of data will be from the second set of memories (e.g., pong), and writing of data will be to the first set of memories (e.g., ping), with the alternating continuing for each successive set of calculations. As mentioned above, each of these various components (processing elements 510, branch metric calculator 505, lookback processor 515, and memories 520 and 530) are preferably implemented within an ASIC. In addition, other memory architectures may be utilized within the scope of the invention.

The branch metric calculator 505 receives an input data stream of encoded bits, typically representative of a voltage level, from an equalizer 425. From the equalizer output bits, for each value of the subset bits, the branch metric calculator 505 selects a closest (most likely) point from the designated or standardized subset of the signaling constellation, and calculates a distance, such as a Euclidean distance, between the equalizer output and the selected constellation point. This distance is the current branch metric for the particular subset bits (values of the subset bit combination).

Figure 7:
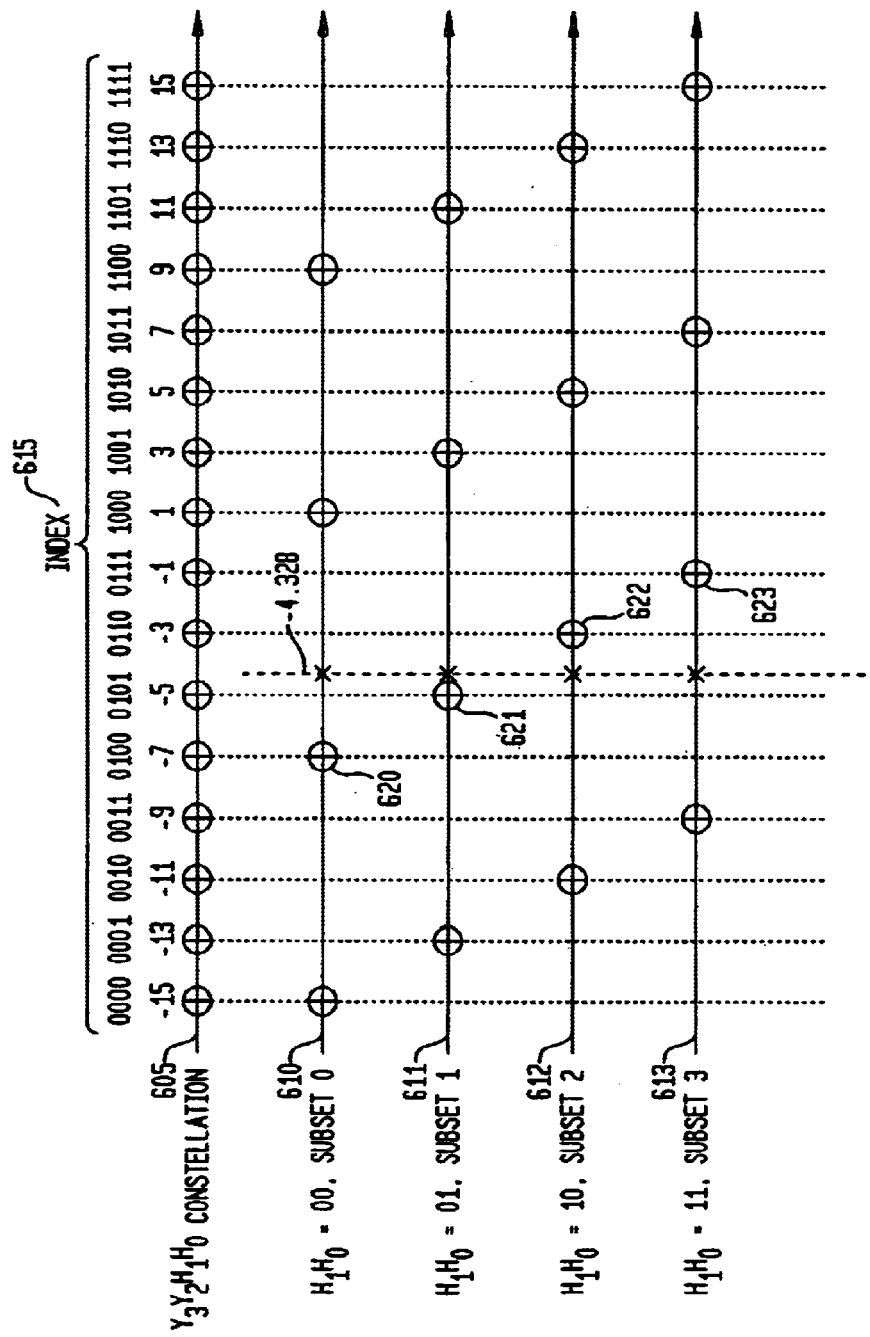
FIG. 7 is a graphical diagram illustrating a PAM signaling constellation and its associated subset constellations, with an index to corresponding encoded bit sequences.

FIG. 7 is a diagram illustrating a PAM signaling constellation and its associated subset constellations, with an index to corresponding encoded bit sequences, for explanation of the processing of the branch metric calculator 505. As illustrated in FIG. 7, a PAM signaling constellation 605 consists of 16 different voltage levels (−15, −13, −11, −9, −7, −5, −3, −1, 1, 3, 5, 7, 9, 11, 13 and 15), which are signaling points. Each voltage level represents or is indexed (through index 615) to a corresponding value of the encoded bits ($y_3y_2y_1y_0$ or $y_3y_2h_1h_0$) (which may simply be referred to as an "index" corresponding to the signaling point). For example, reception of a −9 V signal is mapped to an index (0011) (representing encoded bits ($y_3y_2y_1y_0$)=(0011) or ($y_3y_2h_1h_0$)=(0011)), while reception of a 5 V signal is mapped to an index (1010) (representing encoded bits ($y_3y_2y_1y_0$)=(1010) or ($y_3y_2h_1h_0$)=(1010)). The complete signaling constellation 605 may be divided into four groups (subsets) of four levels each, with each group corresponding to each value of the subset bits ($y_1y_0$ or $h_1h_0$), and each level within the group corresponding to values of the higher significant bits $y_3y_2$. As illustrated in FIG. 7, subset 0 (610) corresponds to $h_1h_0$=00, subset 1 (611) corresponds to $h_1h_0$=01, subset 2 (612) corresponds to $h_1h_0$=10, and subset 3 (613) corresponds to $h_1h_0$=11, and for all four of these subsets, the four signaling points correspond (through index 615) to $y_3y_2$=00, 01, 10 and 11.

As an example, assuming an equalizer output of −4.328, the branch metric calculator 505 selects a closest signaling point from each of the four subsets of the PAM constellation, illustrated as point 620 (−7 V for subset 0), point 621 (−5 V for subset 1) point 622 (−3 V for subset 2), and point 623 (−1 V for subset 3). (As used herein, terms such as "closest" and "smallest" should be understood in a comparative or relative sense, rather than in any absolute sense, such as selecting a first "closest" signaling point from among the available points in a first subset of the constellation, and selecting a second "closest" signaling point from among the available points in a second subset of the constellation, and so on, as discussed above.) For each such closest signaling point of the subset, the branch metric calculator 505 then calculates a branch metric, as a distance, as the square of the absolute value of the difference between the received signal (equalized output) and the selected constellation point. A smaller branch metric is indicative of a smaller distance and, therefore, a higher probability of occurrence. For the example above, the various branch metrics (distances) are calculated as $|-4.328+7|^2$ for subset 0, $|-4.328+5|^2$ for subset 1, $|-4.328+3|^2$ for subset 2, and $|-4.328+1|^2$ for subset 3, with the comparatively smallest branch metric occurring for subset 1 (indicating, all other path metrics being equal, a comparatively higher probability that the transmitted signal was −5 V corresponding to encoded bits 0101). In the preferred embodiment, a branch metric is calculated for each subset combination (h1h0 or y1y0), producing four branch metrics (given two subset bits), which are then stored in a branch metric lookup memory 740 (FIG. 11) for use by the various processing elements 510. (Equivalent alternatives for branch metric determination also will be apparent to those of skill in the art).

Figure 8:
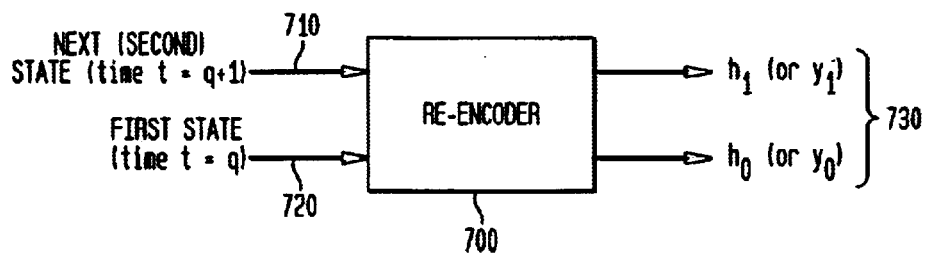
FIG. 8 is a block diagram illustrating a re-encoder in accordance with the present invention.
Figure 9:
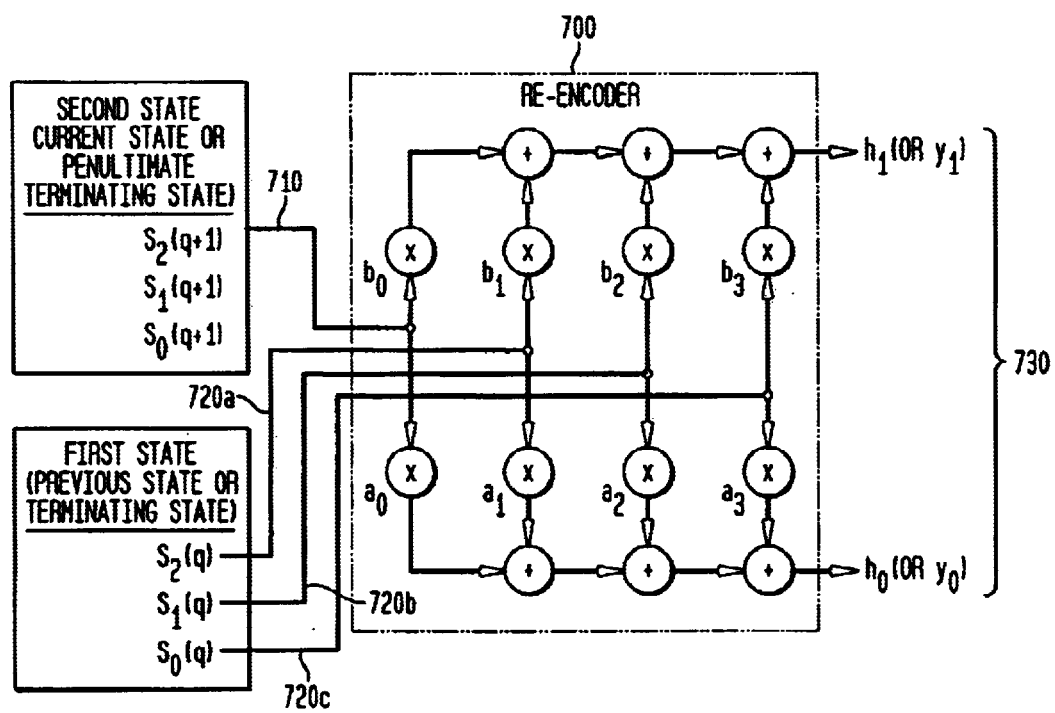
FIG. 9 is a block diagram illustrating, in greater detail, a re-encoder in accordance with the present invention.

Reference to FIGS. 8–13 may be useful for explanation of the functions of the processing elements 510 and lookback processor 515. FIGS. 8 and 9 are block diagrams illustrating a re-encoder in accordance with the present invention. As illustrated in FIG. 8, a re-encoder 700 receives, as inputs 720 and 710, respectively, a first state (at time t=q) and its next (second) state (at time t=q+1), such as a terminating state (S(n−D)) and a penultimate terminating state (the next state following the terminating state) (S(n−D+1)), or such as a previous state (S(n−1)) and a current state (the next state following the previous state) (S(n)). Utilizing the same encoder coefficients used in the encoding, with a first state and a next (or second) state as inputs 720 and 710, the re-encoder produces the subset bits h1h0 (or y1y0) corresponding to the transition from the first state to the second (next) state, as outputs 730.

FIG. 9 is a block diagram illustrating, in greater detail, a re-encoder 700 in accordance with the present invention. As illustrated in FIG. 9, the re-encoder 700 also utilizes encoder coefficients, which are set to the same values used in the encoding of the transmitter, as discussed above. The state of the re-encoder 700 is set to equal the first state (i.e., the previous state or terminating state) $S_2(q)\ S_1(q)\ S_0(q)$, through inputs $720_A$, $720_B$ and $720_C$, respectively. The most significant bit $(S_2(q+1))$ of the next (second) state $(S_2(q+1)\ S_1(q+1)\ S_0(q+1))$, such as the MSB of the corresponding current state or penultimate terminating state, is provided as the input bit to the re-encoder through input 710. As discussed above, the re-encoder 700 then produces, as its output 730, subset bits (h1h0 or y1y0) corresponding to the transition between the input states, such as the subset bits corresponding to the transition from the terminating state to the penultimate terminating state, or the subset bits corresponding to the transition from a previous state to the current state.

In the preferred embodiment, a re-encoder 700 is implemented in both the processing elements 510 and the lookback processor 515. When the re-encoder 700 is implemented in the processing elements 510, its inputs are a previous state (as a first state) and a current state (as a next or second state). When the re-encoder 700 is implemented in the lookback processor 515, its inputs are a terminating state (as a first state) and a penultimate terminating state (as a next or second state).

Figure 10:
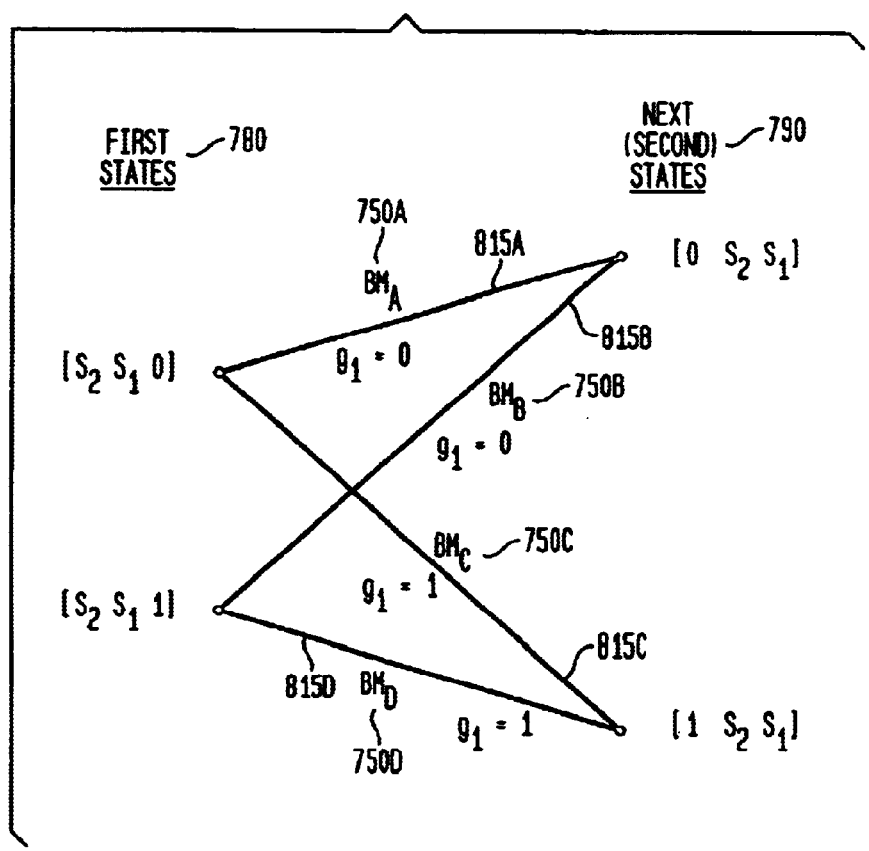
FIG. 10 is a trellis diagram illustrating exemplary state transitions and associated branch metrics.

FIG. 10 is a trellis diagram illustrating general state transitions and associated branch metrics, for an eight-state feedforward encoder. For a rate ½ code, it may be observed that a natural pairing occurs between first states 780 ($S_2S_10$ and $S_2S_11$) and their next (second) states 790 ($0S_2S_1$ and $1S_2S_1$) (or, equivalently, a current (second) state and its previous (first) state). For example, for the feedforward code of FIG. 3A, states 0 and 1 both transition to states 0 and 4. This may be observed in FIG. 10 by setting $S_2$ and $S_1$ to zero ($S_2S_1$=00) for first states 780 and second (next) states 790. Different state transitions will occur by setting $S_1$ and $S_2$ to different values, such as states 2 and 3 transitioning to states 1 and 5 for $S_2S_1$=01. State transitions $815_A$ and $815_B$ occur when the input bit equals zero (g1=0 or x1=0), and state transitions $815_C$ and $815_D$ occur when the input bit equals one (g1=1 or x1=1). Each of these state transitions has an associated branch metric, namely, $BM_A$ ($750_A$), $BM_B$ ($750_B$), $BM_C$ ($750_C$) and $BM_D$ ($750_D$), which, as mentioned above, correspond to the various subset bits h1h0 (or y1y0).

Figure 11:
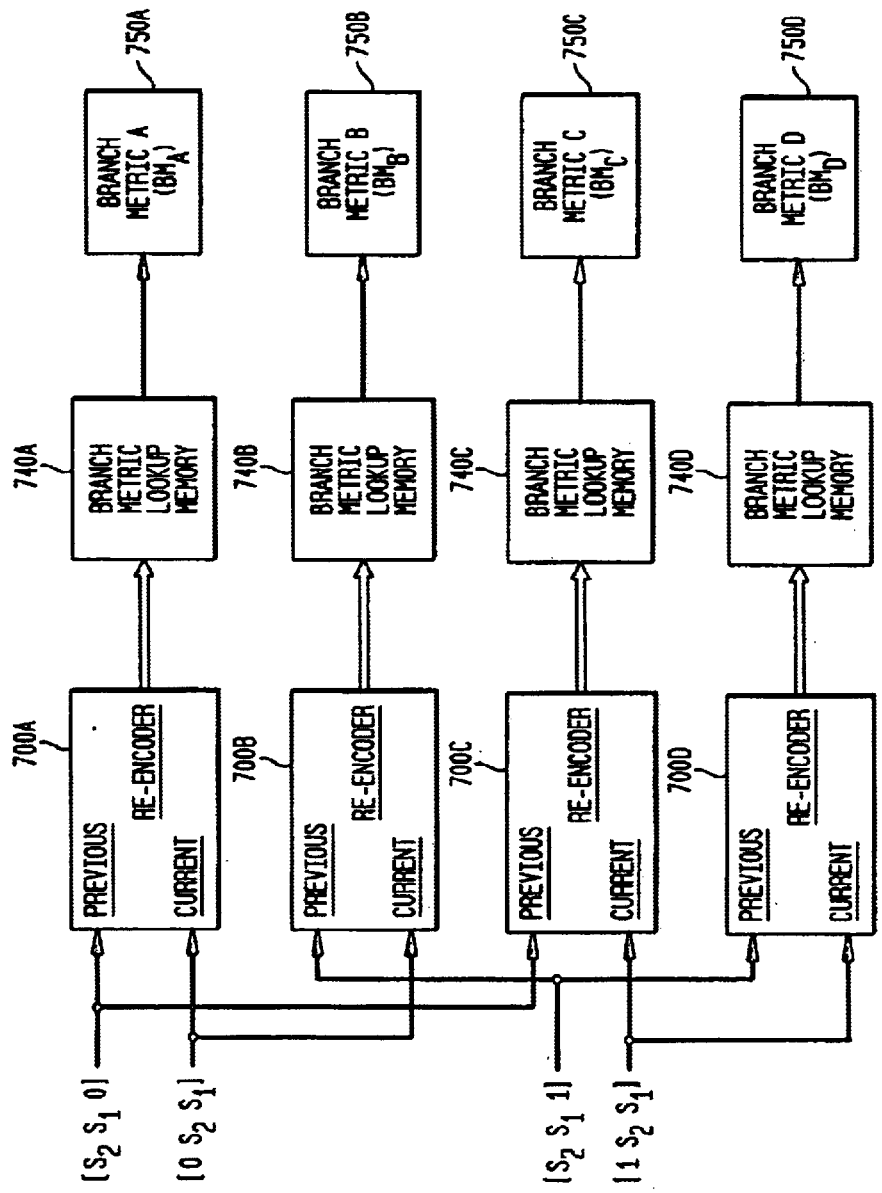
FIG. 11 is a block diagram illustrating the preferred re-encoding and branch metric retrieval by the processing elements in accordance with the present invention.

FIG. 11 is a block diagram illustrating the preferred re-encoding and branch metric retrieval by the processing elements 510 in accordance with the present invention. As mentioned above, the various branch metrics (e.g., $BM_A$, $BM_B$, $BM_C$ and $BM_D$) are computed in the branch metric calculator 505, and all branch metrics are transferred every symbol time to each of the processing elements 510 and stored in a branch metric lookup memory 740. Referring to FIGS. 10 and 11, when any of the second (next) states 790 and first states 780 are input into a re-encoder 700 (illustrated as re-encoders 700A, 700B, 700C and 700D) of the processing elements 510, in the four possible combinations for a rate ½ code, the subset bits associated with each of those four state transitions are provided as outputs from re-encoder 700. Utilizing these corresponding subset bits output from the re-encoder 700, the processing elements 510 then perform a lookup operation, retrieving the branch metrics from the branch metric lookup memory 740 corresponding to these associated subset bits and corresponding state transitions, producing corresponding branch metrics $BM_A$, $BM_B$, $BM_C$ and $BM_D$ (illustrated as $750_A$, $750_B$, $750_C$ and $750_D$). In the preferred embodiment, this branch metric retrieval is performed in parallel by the processing elements 510, for example, for up to 512 states.

Figure 12:
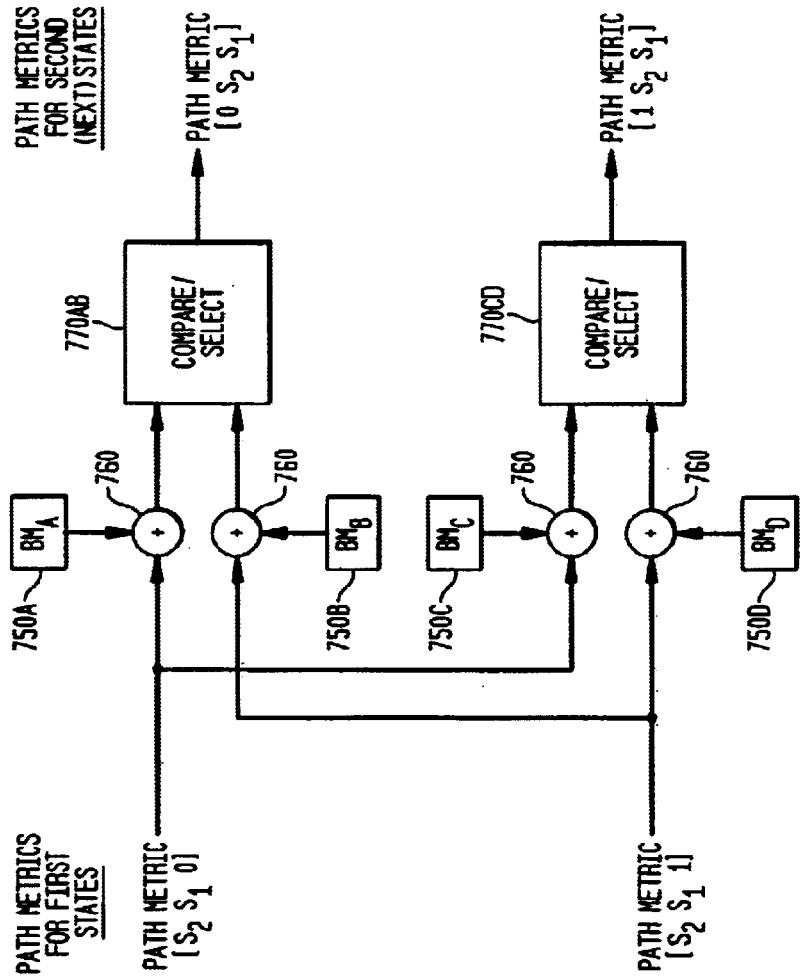
FIG. 12 is a block diagram illustrating the preferred add, compare and select process of the processing elements in accordance with the present invention.

FIG. 12 is a block diagram illustrating the preferred add, compare and select process of the processing elements 510 in accordance with the present invention. Referring to FIGS. 6 and 12, each processing element 510 implements a Viterbi algorithm, calculating maximum likelihood statistics for each state, stored as path metrics in the ping or pong memories 520 and 530. In the preferred embodiment, for parallel processing of up to 512 states, each processing element performs these functions for a group of up to 128 states. As mentioned above, current branch metrics for each value of the subset bits are calculated by the branch metric calculator 505. Using the process illustrated in FIG. 11, the processing elements 510 associate a current branch metric with a corresponding state transition (from a first state $S_2S_10$ or $S_2S_11$ to a second (next) state $0S_2S_1$ or $1S_2S_1$). As illustrated in FIG. 12, utilizing adders (summers) 760, the processing elements 510 add each current branch metric 750 to a path metric of the first states 780 (stored in memory 520 or 530), forming potential path metrics for the next, second states 790. Each of those sums (two sums for a rate ½ code, for each next or second state) is input into the compare/selects blocks 770, in which the sums for each next state are compared, and the smallest path metric is selected (indicative of a comparatively higher probability of occurrence), providing a new path metric for each second (next states), for that particular time.

For example, referring to FIGS. 10 and 12, first states $S_2S_1\mathbf{0}$ or $S_2S_1\mathbf{1}$ both transition to second (next) state $\mathbf{0}S_2S_1$. In addition, based upon previous iterations (if any), first states $S_2S_1\mathbf{0}$ or $S_{2S_1}\mathbf{1}$ both have accumulated path metrics. Branch metric A ($BM_A$) is added to the path metric of first state $S_2S_1\mathbf{0}$ (for transition 815$_A$), and branch metric B ($BM_B$) is added to the path metric of first state $S_2S_1\mathbf{1}$ (for transition 815$_B$); these sums are compared (block 770$_{AB}$), and the smallest is selected, resulting in a new path metric for second (next) state $\mathbf{0}S_2S_1$, for that time (e.g., t=n). Similarly, first states $S_2S_1\mathbf{0}$ or $S_2S_1\mathbf{1}$ both transition to second (next) state $\mathbf{1}S_2S_1$. Branch metric C ($BM_C$) is added to the path metric of first state $S_2S_1\mathbf{0}$ (for transition 815$_C$), and branch metric D ($BM_D$) is added to the path metric of first state $S_2S_1\mathbf{1}$ (for transition 815$_D$); these sums are compared (block 770$_{CD}$), and the smallest is selected, resulting in a new path metric for second (next) state $\mathbf{1}S_2S_1$, also for that time (e.g., t=n). In addition, by retaining only the smallest path metric (of the two potential path metrics), such as the path metrics corresponding to transitions 815$_A$ and transitions 815$_D$, a "pruning" of possible paths (transitions) has occurred, eliminating possible previous states from consideration in the decoding process, such as eliminating first state $S_2S_1\mathbf{1}$ (transition 815$_B$) as a possible previous state for current state $\mathbf{0}S_2S_1$, and eliminating first state $S_2S_1\mathbf{0}$ (transition 815$_C$) as a possible previous state for current state $\mathbf{1}S_2S_1$, for that particular time.

Tracking the current state being processed, each processing element 510 performs these functions for each state of the particular code, resulting in a new path metric for each state, for each time period, also stored in memory 520 or 530, in various forms. In addition to calculating path metrics for each state, each processing element 510 tracks the current state and path being processed, and provides corresponding address generation, for tracking where in memory (520 and 530) each such current path metric for a given state is to be stored (and read from in the next cycle (time t=n+1)). In the preferred embodiment, the memory (520 and 530) is allocated or subdivided into predetermined locations (addresses) for each state. In addition, in the lookback processor 515, there is a lookback memory 860 (FIG. 13) which is allocated or subdivided into predetermined locations (addresses), for each state and for the previous "D" symbol times. The content of each such memory location includes a pointer to another memory location (address) corresponding to its most likely previous state (having been determined by its path metrics), and so on, providing a path of states backward in time. As a consequence, accessing a memory location for a given state provides a pointer to its most likely previous state, and so on, as determined by the path metrics, thereby providing a depth in time, of state transitions, sufficient to reach a terminating state S(n−D) (at time t=n−D). As mentioned above, based upon accumulated path metrics and retention of the comparatively smallest path metrics with each iteration, determination of the most likely previous states tends to converge upon a terminating state S(n−D) and a penultimate terminating state S(n−D+1).

Figure 13:
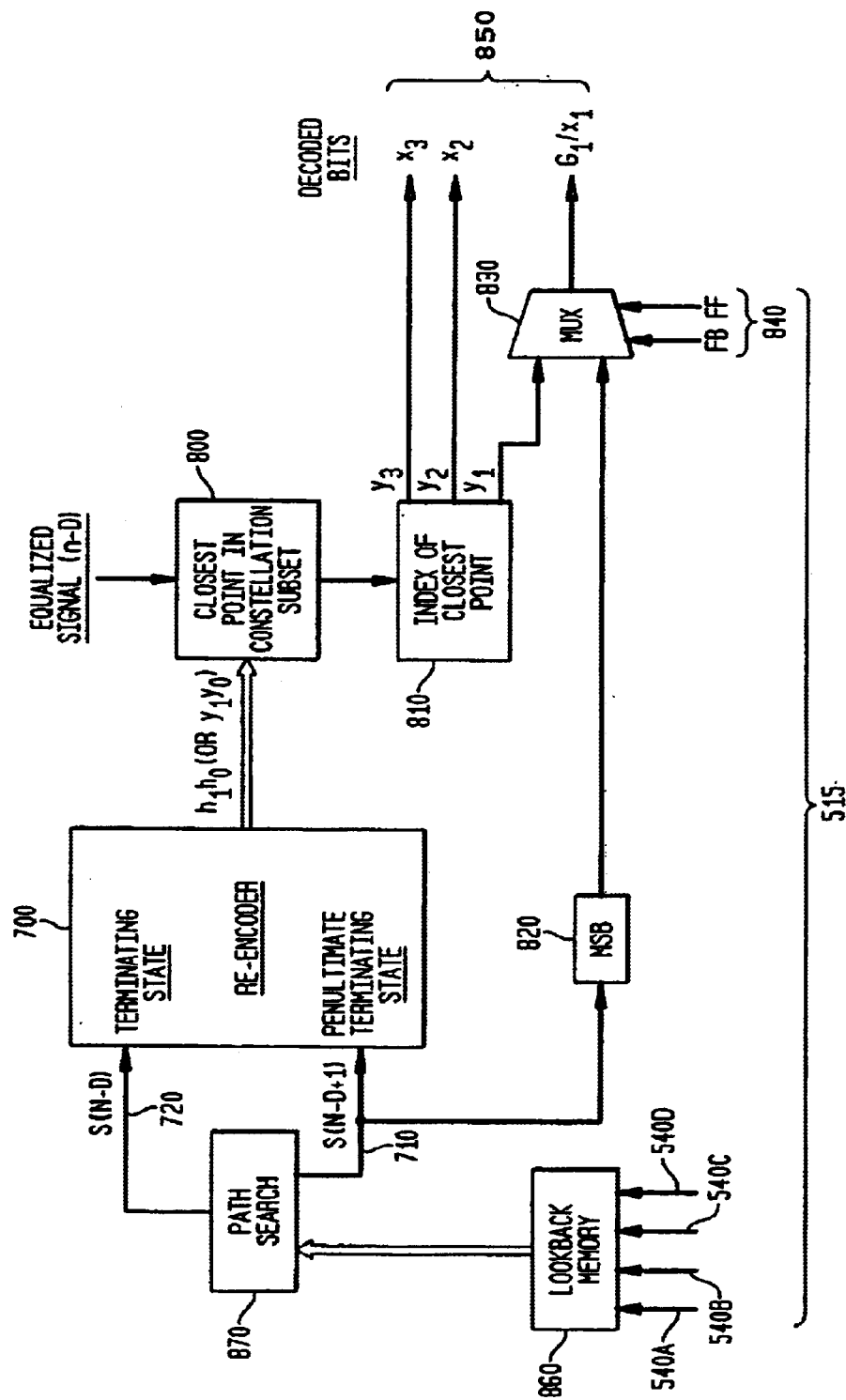
FIG. 13 is a block diagram illustrating, in greater detail, the lookback processor in accordance with the present invention.

FIG. 13 is a block diagram illustrating, in greater detail, the lookback processor 515 in accordance with the present invention. Following the calculations of the processing elements 510, the lookback processor 515 performs the lookback operation discussed previously to decode the input bit stream. From the processing elements 510, the lookback processor 515 has received "lookback information" consisting of, for each current state, pointers to previous states (going back "D" symbol times), and consisting of an identification of a current state having the smallest path metric. The path search function 870 of the lookback processor 515 searches through the lookback memory 860 (which, based upon the compare/select decisions and path metric computations of the processing elements 510, contains pointers from each state to its previous state), to determine or arrive at a terminating state S(n−D) (at time t=n−D) and a penultimate terminating state S(n−D+1) (at time t=n−D+1) (the next state following the terminating state). While there are myriad other ways to perform this task, in the preferred embodiment, this path search begins with the current state having the smallest path metric, and utilizing the pointers stored in lookback memory 860, the path search function 870 determines the terminating state S(n−D) (at time t=n−D) and a penultimate terminating state S(n−D+1) (at time t=n−D+1) (the next state following the terminating state).

Continuing to refer to FIG. 13, the path search function 870 of the lookback processor 515 provides the terminating state S(n−D) and a penultimate terminating state S(n−D+1) as inputs to a re-encoder 700, which generates the subset bits (h1h0 or y1y0) corresponding to the transition from the terminating state S(n−D) to the penultimate terminating state S(n−D+1). Utilizing the corresponding subset bits, and the equalized output or signal (for time t=n−D) from the equalizer 425, the lookback processor 515 (in block 800) selects the closest point in the subset of the signaling constellation (as discussed above with reference to FIG. 7).

The closest signaling point selected is then mapped to its corresponding index. (in block 810), providing the higher significant output bits y3 and y2, which map directly (are equal) to decoded higher significant bits x3 and x2, and providing the subset bits (h1h0 or y1y0). The MSB of the subset bits (output bit y1) and the MSB of the penultimate terminating state (block 820) are input into a multiplexer 830. Based upon the selection inputs 840 (as feedback or feedforward), the multiplexer 830 outputs the decoded least significant bit, g1 (equal to the MSB of the penultimate terminating state, for a feedforward code) or x1 (equal to y1, the MSB of the subset bits, for a feedback code). As a consequence, from the input of the terminating state and the penultimate terminating state, with the equalized output and selection of a feedforward or feedback code, the lookback processor 515 outputs a decoded bit stream 850, namely, x3, x2 and g1/x1.

Other equivalent systems of memory management and lookback decoding may also be implemented within the scope of the present invention. Referring to FIG. 1, the feedforward encoder 100 also functions as a shift register, with a right shift encoding or moving forward in time, and with a left shift decoding or moving backward in time. With every right shift, the LSB of the previous state is shifted out of the encoder 100. In the decoding process, for each current state, this LSB may be saved in memory by the processing elements 510, making the LSB available for current states and all previous states. The lookback processor 515, by applying the LSB with the current state and performing a left shift (of an encoder populated with the proper encoder coefficients), results in the previous state, and a left shift output of an input bit. This process may be continued, moving backward in time, resulting in a determination of the MSB of the penultimate terminating state and a determination of the terminating state S(n−D) from the left shift from the penultimate terminating state S(n−D+1). Following this determination, the decoding may be determined as discussed above with respect to FIG. 13, by re-encoding to determine the subset bits and so on, resulting in the decoded bits x3, x2 and g1/x1.

FIG. 14 is a flow diagram illustrating a method embodiment for universal decoding in accordance with the present invention, and provides a useful summary of the present invention. The method begins, start step 900, with an exchange of information between each encoder (on the transmission side) and each decoder (on the receiving side). That exchange of information enables a determination of whether the encoding utilized a feedforward or a feedback process, and determines the encoder coefficients (e.g., b3, b2, b1, b0 and a3, a2, a1, a0). With the start of data transmission, step 905, the received signal is demodulated and equalized, as needed for a given protocol or standard, to produce an equalized output, such as a digital representation of a voltage, as discussed above. For example, for PAM, the received signal is preferably only equalized, while for QAM, the received signal is generally both demodulated and equalized.

From the equalized output, for each current state, the most likely previous state is determined, step 910, utilizing the branch and path metrics, and the compare and selection process discussed above. (During the first few decoding cycles, step 910 may be repeated, to generate a sufficient depth of previous states for a convergence of paths, as discussed above). More specifically, the current state and a previous state are re-encoded to produce corresponding subset bits to select a corresponding branch metric for that state transition. That branch metric is added to a corresponding path metric of a previous state to generate a potential current path metric for the current state, and compared with the other potential current path metrics of the other state transitions, with the smallest potential current path metric retained as the actual path metric, as discussed above, for each current state. When the most likely previous state has been determined for each current state, step 915, the look-back process may begin, step 920, with the determination of a penultimate terminating state and a terminating state. The penultimate terminating state and the terminating state are then re-encoded as discussed above, utilizing the encoder coefficients, to determine the associated subset bits, such as h1h0 or y1y0, step 925.

From the associated subset bits and the equalized output, the closest signaling point from the signaling constellation is determined, step 930. From the closest signaling point, a corresponding index (y3y2y1y0) is determined, step 935, providing the higher significant decoded bits (x3 and x2) (as equal to the corresponding higher significant bits of the index). When the encoding was performed with a feedback process in step 940, the method determines the LSB input bit (x1) as equal to the most significant subset bit,.e.g., x1=y1−h1, step 945. When the encoding was not performed with a feedback process in step 940, i.e., the encoding was performed with a feedforward process, the method determines the LSB input bit (g1) as equal to the MSB of the penultimate terminating state, step 950. Following the determinations of steps 945 or 950, the decoded bits are output, namely, the decoded LSB input bit (x1 or g1) and the decoded higher significant input bits (x3 and x2), step 955. When there is additional data for decoding, step 960, the method returns to step 905. When there is no additional data for decoding in step 960, the method may end, return step 965.

Numerous advantages of the present invention may be apparent from the discussion above. First, in accordance with the present invention, a single decoder is capable of decoding both feedforward and feedback codes. The universal decoder of the present invention not only decodes both feedforward and feedback codes, but also decodes codes having differing or variable numbers of states, such as 512 states or 32 states. The universal decoder of the present invention is therefore capable of decoding a 512-state feedforward code which may be utilized for HDSL2, and decoding various legacy codes such as an 8-state feedback code and a 32-state feedback code. The preferred decoder is also programmable, allowing the same hardware to provide such universal decoding, without requiring separate hardware for independent and redundant decoding systems. Lastly, the preferred universal decoder is capable of utilizing parallel processing to, among other things, increase the speed of decoding.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. This disclosure is intended to cover all such modifications that fall within the scope of the appended claims.

It is claimed:

1. A method for universal decoding of data, the data having been encoded utilizing a plurality of encoder coefficients and transmitted as a signal from a transmitter to a receiver to form a received signal, the method comprising:

(a) for each current state of a plurality of states, determining a most likely previous state to form a plurality of previous states;

(b) from the plurality of previous states, determining a terminating state and a penultimate terminating state, the penultimate terminating state having a most significant bit;

(c) determining a value of a plurality of subset bits from the terminating state and the penultimate terminating state, the plurality of subset bits having a most significant subset bit;

(d) if the data has been feedforward encoded by a feedforward convolutional encoder, determining a decoded least significant input bit as equal to the most significant bit of the penultimate terminating state; and (e) if the data has been feedback encoded by a feedback convolutional encoder, determining the decoded least significant input bit as equal to the most significant subset bit; and (f) determining whether the data has been feedforward encoded by a feedforward convolutional encoder or feedback encoded by a feedback convolutional encoder, wherein one of the steps (d) and (e) is performed based on step (f).

2. The method of claim 1, further comprising, prior to step (a):

exchanging information between the receiver and the transmitter, the information including the plurality of encoder coefficients and a designation of the encoded data as either feed forward encoded or feedback encoded.

3. The method of claim 1, wherein step (a) further comprises:
equalizing the received signal to form an equalized output.

4. The method of claim 3, further comprising:
from the equalized output, determining a closet point of a signaling constellation subset, for each combination of values of the plurality of subset bits.

5. The method of claim 4, further comprising:
for each combination of values of the plurality of subset bits, determining a corresponding branch metric as a distance between the equalized output and the closest point of the signaling constellation subset.

6. The method of claim 5, further comprising:
for each current state of the plurality of states, selecting a plurality of potential previous states; and
for each potential previous state of the plurality of potential previous states, re-encoding the current state and the potential previous state to determine a corresponding value of the plurality of subset bits for a state transition from the potential previous state to the current state.

7. The method of claim 6, further comprising:
for each state transition from the potential previous state to the current state, providing a corresponding branch metric associated with the corresponding value of the plurality of subset bits, and determining a potential path metric for each current state of the plurality of states as an arithmetic sum of the corresponding branch metric and a path metric associated with the potential previous state to form a plurality of potential path metrics for each current state of the plurality of states; and
for each current state of the plurality of states, determining a path metric by selecting a comparatively smallest potential path metric of the plurality of potential path metrics.

8. The method of claim 7, wherein the determination of the terminating state and the penultimate terminating state corresponds to a comparatively smallest path metric.

9. The method of claim 6, wherein the re-encoding further comprises:
setting an encoder state to the potential previous state, and utilizing the encoder coefficients, encoding as an input bit a most significant bit of the current state.

10. The method of claim 3, wherein step (c) further comprises:
re-encoding the penultimate terminating state and the terminating state to determine a specific value of the plurality of subset bits corresponding to a state transition from the terminating state to the penultimate terminating state;
selecting a subset of a signaling constellation corresponding to the specific value of the plurality of subset bits;
from the equalized output, selecting a closest point in the subset of the signaling constellation; and
determining a corresponding index associated with the closest point, the corresponding index having a higher significant bit.

11. The method of claim 10, further comprising:
from the corresponding index, determining a decoded higher significant input bit as equal to a corresponding higher significant bit of the corresponding index.

12. The method of claim 10, wherein the re-encoding further comprises:
setting an encoder state to the terminating state, and utilizing the encoder coefficients, encoding as an input bit the most significant bit of the penultimate terminating state.

13. The method of claim 3, further comprising:
for a quadrature amplitude modulated received signal, demodulating the received signal prior to equalizing the received signal to form the equalized output.

14. The method of claim 1, wherein the value of the plurality of subset bits is determined in a lookup table based upon a state transition from the terminating state to the penultimate terminating state.

15. An apparatus for universal decoding of data, the data having been encoded utilizing a plurality of encoder coefficients and transmitted as a signal from a transmitter to a receiver to form a received signal, the apparatus comprising:
a memory; and
a processor coupled to the memory, wherein the processor, when operative, is configured, for each current state of a plurality of states, to determine a most likely previous state to form a plurality of previous states, and from the plurality of previous states, to determine a terminating state and a penultimate terminating state, the penultimate terminating state having a most significant bit; the processor further configured, if the data has been feedforward encoded by a feedforward convolutional encoder, to determine a decoded least significant input bit as equal to the most significant bit of the penultimate terminating state, and if the data has been feedback encoded by a feedback convolutional encoder, to determine the decoded least significant input bit as equal to the most significant subset bit.

16. The apparatus of claim 15, wherein the processor is further configured to exchange information, the information including the plurality of encoder coefficients and a designation of the encoded data as either feedforward encoded or feedback encoded.

17. The apparatus of claim 15, further comprising:
an equalizer coupled to the processor, the equalizer to form an equalized output from the received signal.

18. The apparatus of claim 17, wherein the processor is further configured to determine, from the equalized output, a closest point of a signaling constellation subset, for each combination of values of the plurality of subset bits.

19. The apparatus of claim 17, wherein the processor is further configured to determine, for each combination of values of the plurality of subset bits, a corresponding branch metric as a distance between the equalized output and the closest point of the signaling constellation subset.

20. The apparatus of claim 19, wherein the processor is further configured, for each current state of the plurality of states, to determine a plurality of potential previous states; and for each potential previous state of the plurality of potential previous states, the processor further configured to re-encode the current state and the potential previous state to determine a corresponding value of the plurality of subset bits for a state transition from the potential previous state to the current state.

21. The apparatus of claim 20, wherein the processor is further configured, for each state transition from the potential previous state to the current state, to obtain from the memory a corresponding branch metric associated with the corresponding value of the plurality of subset bits, and to determine a potential path metric for each current state of the plurality of states as an arithmetic sum of the corresponding branch metric and a path metric associated with the potential previous state to form a plurality of potential path metrics for each current state of the plurality of states; and for each current state of the plurality of states, to determine a path metric by selecting a comparatively smallest potential path metric of the plurality of potential path metrics.

22. The apparatus of claim 21, wherein the processor is further configured to determine the terminating state and the penultimate terminating state as corresponding to a comparatively smallest path metric.

23. The apparatus of claim 20, wherein the processor is further configured to re-encode by setting an encoder state to the potential previous state, and utilizing the encoder coefficients, to encode as an input bit a most significant bit of the current state.

24. The apparatus of claim 17, wherein the processor is further configured to re-encode the penultimate terminating state and the terminating state to determine a specific value of the plurality of subset bits corresponding to a state transition from the terminating state to the penultimate terminating state; to select a subset of a signaling constellation corresponding to the specific value of the plurality of subset bits; from the equalized output; the processor further configured to select a closest point in the subset of the signaling constellation and determine a corresponding index associated with the closest point, the corresponding index having a higher significant bit.

25. The apparatus of claim 24, wherein the processor is further configured to determine, from the corresponding index, a decoded higher significant input bit as equal to a corresponding higher significant bit of the corresponding index.

26. The apparatus of claim 24, wherein the processor is further configured to re-encode by setting an encoder state to the terminating state, and utilizing the encoder coefficients, encoding as an input bit the most significant bit of the penultimate terminating state.

27. The apparatus of claim 17, further comprising:
a demodulator couples to the equalizer, to demodulate the received signal prior to equalizing to form the equalized output.

28. The apparatus of claim 15, wherein the processor is further configured to access a lookup table stored in the memory, to determine the value of the plurality of subset bits based upon a state transition from the terminating state to the penultimate terminating state.

29. The apparatus of claim 15, wherein the memory stores, for each current state of the plurality of states, a pointer to the most likely previous state.

30. The apparatus of claim 15, wherein the memory stores, for each current state of the plurality of states, a least significant bit to shift each current state to its most likely previous state.

31. The apparatus of claim 15, wherein the processor is implemented as an application specific integrated circuit.

32. The apparatus of claim 15, wherein the processor is implemented as a custom integrated circuit.

33. The apparatus of claim 15, wherein the processor is implemented as a microprocessor.

34. An apparatus for decoding of feedback encoded data utilizing parallel processing, the data having been feedback encoded by a feedback convolutional encoder utilizing a plurality of encoder coefficients and transmitted as a signal from a transmitter to a receiver to form a received signal, the apparatus comprising:
a memory; and
a processor coupled to the memory, wherein the processor, when operative, includes a plurality of parallel processing elements, each of the plurality of parallel processing elements configured to determine for for each current state of a respective plurality of current states, a most likely previous state to form a plurality of previous states; the processor further configured to determine a terminating state and a penultimate terminating state from previous states formed by the plurality of parallel processing elements, and from the terminating state and the penultimate terminating state, to determine a value of a plurality of subset bits, the plurality of subset bits having a most significant subset bit; and the processor further configured to determine a decoded least significant input bit as equal to the most significant subset bit.

35. The apparatus of claim 34, the apparatus also for decoding of feedforward encoded data, wherein the processor is further configured, when the data has been feedforward encoded, to determine a decoded least significant input bit as equal to a most significant bit of the penultimate terminating state.

36. The apparatus of claim 34, comprising:
an equalizer coupled to the processor, the equalizer to form an equalized output from the received signal; and
wherein the processor is further configured to determine, from the equalized output, a closest point of a signaling constellation subset, and to determine a corresponding branch metric as a distance between the equalized output and the closest point of the signaling constellation subset for each combination of values of the plurality of subset bits; the processor further configured, for each current state of the plurality of current states, to determine a plurality of potential previous states, to determine a corresponding value of the plurality of subset bits for a state transition from the potential previous state to the current state, and to determine a potential path metric for each current state of the plurality of current states as an arithmetic sum of the corresponding branch metric and a path metric associated with the potential previous state to form a plurality of potential path metrics for each current state of the plurality of states; and for each current state of the plurality of states, to determine a path metric by selecting a comparatively smallest potential path metric of the plurality of potential path metrics.

37. The apparatus of claim 34, wherein the processor is further configured to determine a specific value of the plurality of subset bits corresponding to a state transition from the terminating state to the penultimate terminating state; to select a subset of a signaling constellation corresponding to the specific value of the plurality of subset bits; and from an equalized output, the processor further configured to select a closest point in the subset of the signaling constellation and determine a corresponding index associated with the closest point; and the processor further configured to determine, from the corresponding index, a decoded higher significant input bit as equal to a corresponding higher significant bit of the corresponding index.

38. An apparatus for universal decoding of data, the data having been encoded utilizing a plurality of encoder coefficients and transmitted as a signal from a transmitter to a receiver to form a received signal, the apparatus comprising:
an equalizer to determine an equalized output from the received signal;
a first memory;
a second memory;
a branch metric calculator coupled to the equalizer, wherein the branch metric calculator, when operative, is configured to determine, from the equalized output, a closest point of a signaling constellation subset, and to determine a corresponding branch metric as a distance between the equalized output and the closest point of the signaling constellation subset, for each combination of values of the plurality of subset bits;

a plurality of processing elements coupled to the first memory and to the second memory, further coupled to the branch metric calculator, wherein the plurality of processing elements, when operative, are configured, for each current state of the plurality of states, to determine a plurality of potential previous states, and for each potential previous state of the plurality of potential previous states, to determine a corresponding value of the plurality of subset bits for a state transition from the potential previous state to the current state by re-encoding the potential previous state and the current state; the plurality of processing elements further configured to read a path metric associated with a previous state alternatingly from the first memory and from the second memory, and to determine a potential path metric for each current state of the plurality of states as an arithmetic sum of the corresponding branch metric and a path metric associated with the potential previous state to from a plurality of potential path metrics for each current state of the plurality of states; and for each current state of the plurality of states, to determine a path metric by selecting a comparatively smallest potential path metric of the plurality of potential path metrics; and a lookback processor couples to the plurality of processing elements, to the first memory and to the second memory, wherein the lookback processor, when operative, is configured to determine a terminating state and a penultimate terminating state, from the plurality of previous states, based upon a comparatively smallest path metric, the penultimate terminating state having a most significant bit; the lookback processor further configured to determine a specific value of a plurality of subset bits by re-encoding the terminating state and the penultimate terminating state, the plurality of subset bits having a most significant subset bit; and the lookback processor further configured, when the data has been feedforward encoded, to determine a decoded least significant input bit as equal to the most significant input bit as equal to the most significant bit of the penultimate terminating state, and when the data has been feedback encoded, to determine the decoded least significant input bit as equal to the most significant subset bit.

39. The apparatus of claim 38, wherein the lookback processor is further configured to select a subset of a signaling constellation corresponding to the specific value of the plurality of subset bits; and from the equalized output, the lookback processor further configured to select a closest point in the subset of the signaling constellation and determine a corresponding index associated with the closest point; and the lookback processor further configured to determine, from the corresponding index, a decoded plurality of higher significant input bits as equal to a corresponding plurality of higher significant bits of the corresponding index.

40. The apparatus of claim 38, wherein the lookback processor is further configured to re-encode by setting an encoder state to the terminating state, and utilizing the encoder coefficients, encoding as an input bit the most significant bit of the penultimate terminating state.

41. The apparatus of claim 38, wherein the processing elements are further configured to re-encode by setting an encoder state to the potential previous state, and utilizing the encoder coefficients, to encode as an input bit a most significant bit of the current state.

42. An apparatus for decoding of feedforward encoded data utilizing parallel processing, the data having been feedforward encoded by a feedforward convolutional encoder utilizing a plurality of encoder coefficients and transmitted as a signal from a transmitter to a receiver to form a received signal, the apparatus comprising:

a memory; and a processor coupled to the memory, wherein the processor, when operative, includes a plurality of parallel processing elements, the plurality of processing elements configured to determine, for each of a plurality of current states, a most likely previous state to form a plurality of previous states; the processor further configured to determine a terminating state and a penultimate terminating state from previous states formed by the plurality of parallel processing elements, and from the terminating state and the penultimate terminating state, to determine a value of a plurality of subset bits; and the processor further configured to determine a decoded least significant input bit as equal to a most significant bit of the penultimate terminating state, the apparatus also for decoding of feedback encoded data, wherein the plurality of subset bits has a most significant subset bit, and wherein the processor is further configured, when the data has been feedback encoded by a feedback convolutional encoder, to determine a decoded least significant input bit as equal to the most significant subset bit.

43. The apparatus of claim 42, further comprising:

an equalizer coupled to the processor, the equalizer to form an equalized output from the received signal; and wherein the processor is further configured to determine, from the equalized output, a closest point of a signaling constellation subset, and to determine a corresponding branch metric as a distance between the equalized output and the closest point of the signaling constellation subset for each combination of values of the plurality of current states, to determine a plurality of potential previous states, and for each potential previous state of the plurality of potential previous states, to determine a corresponding value of the plurality of subset bits for a state transition from the potential previous state to the current state, and to determine a potential path metric for each current state of the plurality of current states as an arithmetic sum of the corresponding branch metric and a path metric associated with the potential previous state to form a plurality of potential path metrics for each current state of the plurality of states; and for each current state of the plurality of states, to determine a path metric by selecting a comparatively smallest potential path metric of the plurality of potential path metrics.

44. The apparatus of claim 42, herein the processor is further configured to determine a specific value of the plurality of subset bits corresponding to a state transition from the terminating state tot he penultimate terminating state; to select a subset of a signaling constellation corresponding to the specific value of the plurality of subset bits; and from an equalized output, the processor further configured to select a closest point in the subset of the signaling and determine a corresponding index associated with the closest point; and the processor further configured to determine, from the corresponding index, a decoded higher significant input bit as equal to a corresponding higher significant input bit as equal to a corresponding higher significant bit of the corresponding index.

45. A method for universal decoding of data, the method comprising:
- receiving an encoded signal having been encoded by a feedback convolutional encoder;
- using a feedforward convolutional decoder to decode the encoded signal;
- producing subset information and state information during decoding of the encoded signal by the feedforward convolutional decoder;
- determining that the encoded signal is feedback encoded; and
- setting, based on the determining, a value of a decoded bit produced by the feedforward convolutional decoder equal to a value of a bit of the subset information.

46. An apparatus for universal decoding of data, comprising:
- decoding logic configured to produce subset information and state information based on an encoded signal received by the decoding logic; and
- lookback logic configured output a decoded bit based on whether the encoded signal is feedback encoded by a feedback convolutional encoder or feedforward encoded by a feedforward convolutional encoder, the lookback logic configured to set a value of the decoded bit equal to a bit of the state information if the encoded signal is feedforward encoded by a feedforward convolutional encoder, the lookback logic further configured to set a value of the decoded bit equal to a bit of the subset information if the encoded signal is feedback encoded by a feedback convolutional encoder.

47. The apparatus of claim 46, wherein the decoding logic is configured to produce the subset information and the state information independent of whether the encoded signal is feedback encoded by a feedback convolutional encoder or feedforward encoded by a feedforward convolutional encoder.

* * * * *